(12) United States Patent
Shinn

(10) Patent No.: US 12,379,005 B2
(45) Date of Patent: Aug. 5, 2025

(54) PROPULSION AND BRAKING SYSTEM USING CLUTCH

(71) Applicant: STXENGINE CO., LTD, Changwon-si (KR)

(72) Inventor: Jae Yong Shinn, Gimhae-si (KR)

(73) Assignee: STXENGINE CO., LTD, Changwon-si (KR)

( * ) Notice: Subject to any disclaimer, the term of this patent is extended or adjusted under 35 U.S.C. 154(b) by 620 days.

(21) Appl. No.: 17/780,375

(22) PCT Filed: Nov. 6, 2020

(86) PCT No.: PCT/KR2020/015456
§ 371 (c)(1),
(2) Date: May 26, 2022

(87) PCT Pub. No.: WO2021/107439
PCT Pub. Date: Jun. 3, 2021

(65) Prior Publication Data
US 2022/0411036 A1    Dec. 29, 2022

(30) Foreign Application Priority Data

Nov. 27, 2019    (KR) .......................... 10-2019-0154271

(51) Int. Cl.
*F16D 48/06*     (2006.01)
*B63H 21/17*     (2006.01)
(Continued)

(52) U.S. Cl.
CPC ........... *F16D 48/066* (2013.01); *B63H 21/17* (2013.01); *B63H 23/08* (2013.01); *B63H 23/30* (2013.01);
(Continued)

(58) Field of Classification Search
CPC .................. F16D 48/066; F16D 48/02; F16D 2048/0221; F16D 2048/0227;
(Continued)

(56) References Cited

U.S. PATENT DOCUMENTS 3,202,018 A  *  8/1965  Hilpert .................... F16D 48/04
                                                    192/3.24
4,451,238 A      5/1984  Arnold
(Continued)

FOREIGN PATENT DOCUMENTS

CN    101896386 A      11/2010
JP    S4886289 A   *   11/1973
(Continued)

OTHER PUBLICATIONS

JPS4886289 translation (Year: 1973).*
(Continued)

*Primary Examiner* — Timothy Hannon
(74) *Attorney, Agent, or Firm* — Sughrue Mion, PLLC

(57) ABSTRACT

The present invention relates to a propulsion and braking system using a clutch, the system comprising: a device that has, embedded therein, a clutch operation pressure-regulating valve, and a clutch and gears for controlling a driven body in the same and opposite rotational direction of a driving body; and a control unit for regulating the rotational speed of the driven body so as to enable a continuous operation at a speed that is lower than a rated rotational speed by using the slip of the clutch, and controlling so that the engagement timing control of the clutch and engagement of same are sustained if the driven body requires operation at the rated rotational speed or higher, wherein, when a braking signal is inputted into the control unit during propulsion of the driven body, the control unit removes the operation pressure of the clutch embedded in the device that
(Continued)

is in operation, activates the clutch for controlling the rotational direction of the driven body to the reverse rotational direction, and then regulates the operation pressure of the clutch by means of the valve so as to enable the control of the braking of the propulsive body. The propulsion and braking system using a clutch, according to the present invention, is related to all equipment requiring propulsion and braking.

15 Claims, 9 Drawing Sheets

(51) Int. Cl.
  *B63H 23/08* (2006.01)
  *B63H 23/30* (2006.01)
  *B63H 23/35* (2006.01)
  *F16D 48/02* (2006.01)
  *B63H 21/22* (2006.01)
(52) U.S. Cl.
  CPC ............. *B63H 23/35* (2013.01); *F16D 48/02* (2013.01); *B63H 21/22* (2013.01); *F16D 2048/0221* (2013.01); *F16D 2500/1105* (2013.01)
(58) Field of Classification Search
  CPC ..... F16D 2048/0266; F16D 2500/1105; B63H 21/17; B63H 2223/08; B63H 2223/30; B63H 2223/35; B63H 2223/02
  See application file for complete search history.

(56) References Cited

U.S. PATENT DOCUMENTS

| | | | |
|---|---|---|---|
| 5,085,302 A | * | 2/1992 | Kriesels .................... F16H 3/14 192/51 |
| 6,679,740 B1 | * | 1/2004 | Imanaka ............... F16D 48/066 440/86 |

FOREIGN PATENT DOCUMENTS

| | | | | |
|---|---|---|---|---|
| JP | 4-31611 A | | | 2/1992 |
| JP | 9-2390 A | | | 1/1997 |
| JP | 9-150792 A | | | 6/1997 |
| JP | 10-278889 A | | | 10/1998 |
| JP | 2001-71995 A | | | 3/2001 |
| JP | 2019124278 A | * | | 7/2019 |
| KR | 10-2013-0126239 A | | | 11/2013 |
| KR | 20190123020 A | * | | 10/2019 |

OTHER PUBLICATIONS

JP2019124278 translation (Year: 2019).*
KR20190123020 translation (Year: 2019).*
International Search Report for PCT/KR2020/015456 dated, Jan. 29, 2021 (PCT/ISA/210).

* cited by examiner

[FIG. 1]
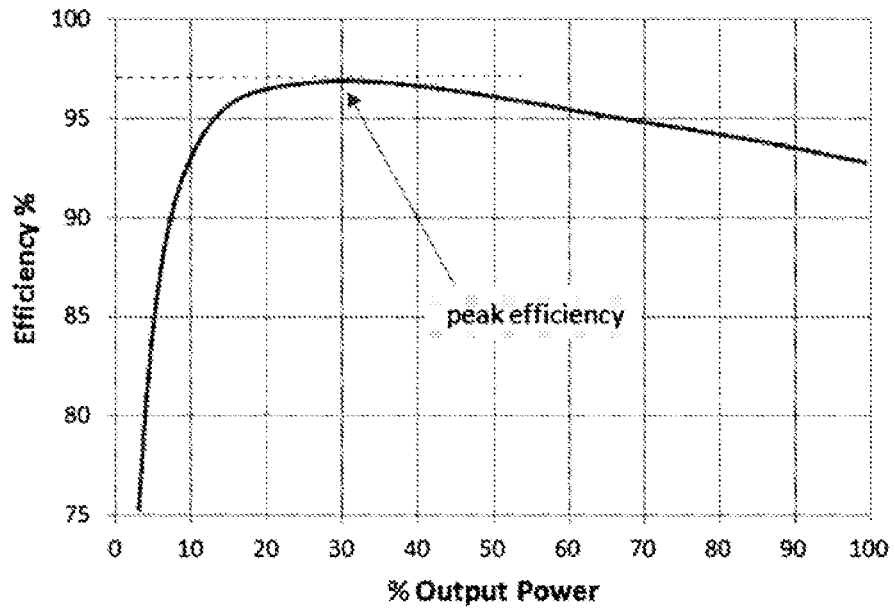
[FIG. 2]
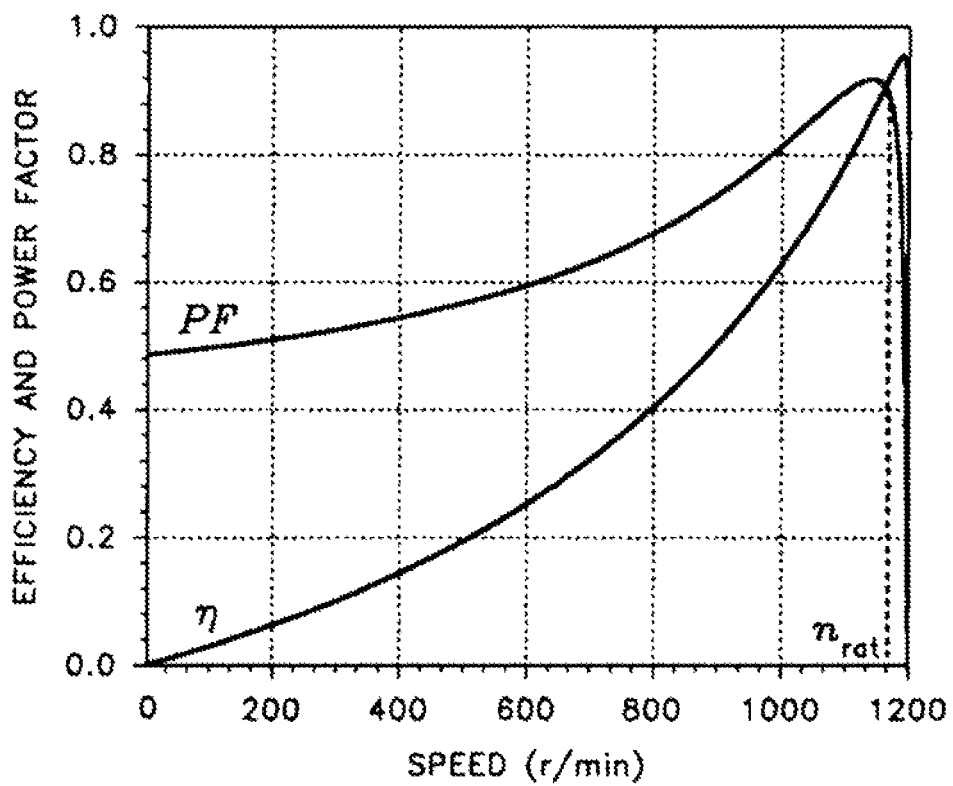

[FIG. 3]
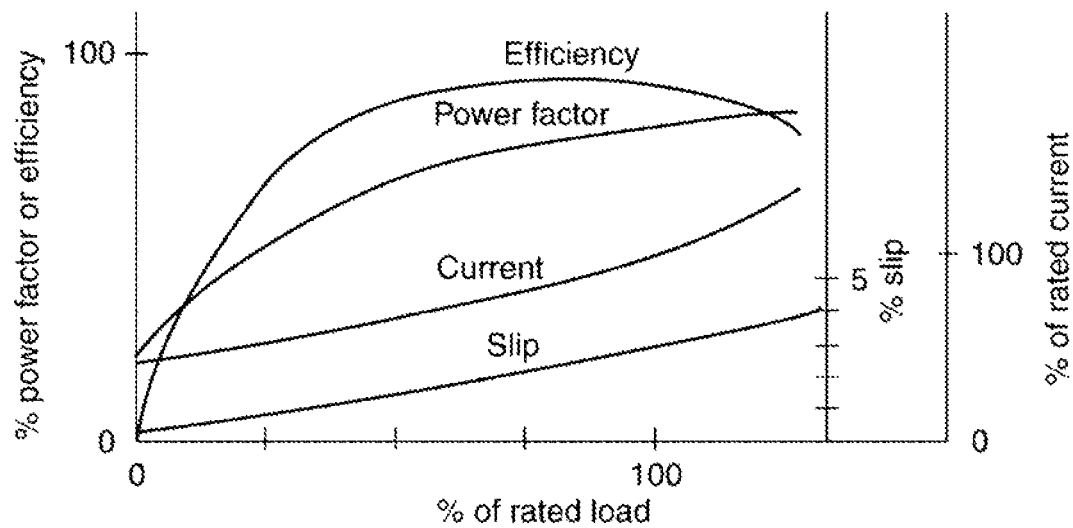
[FIG. 4]
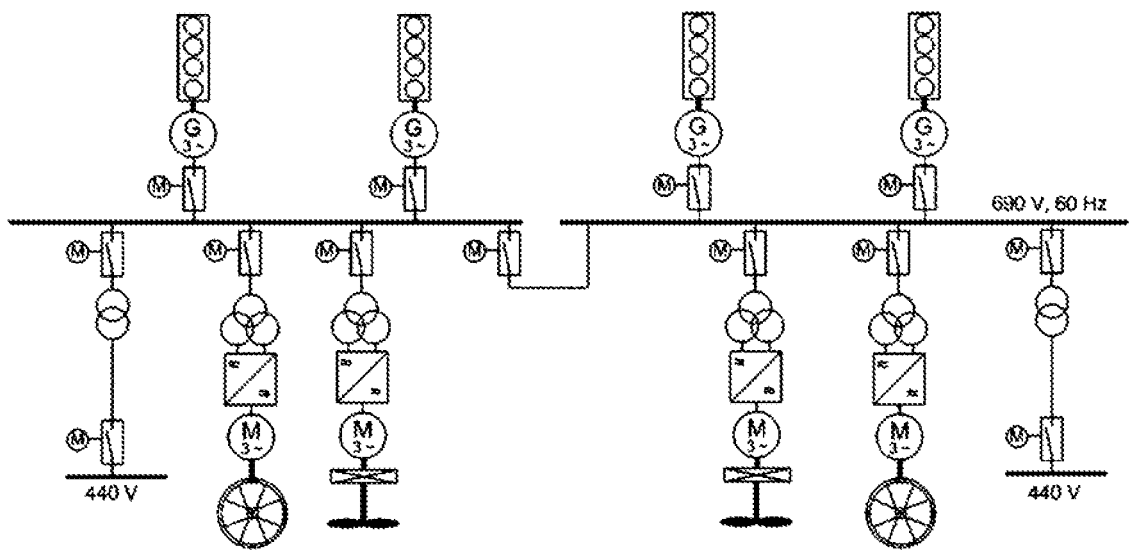

[FIG. 5]
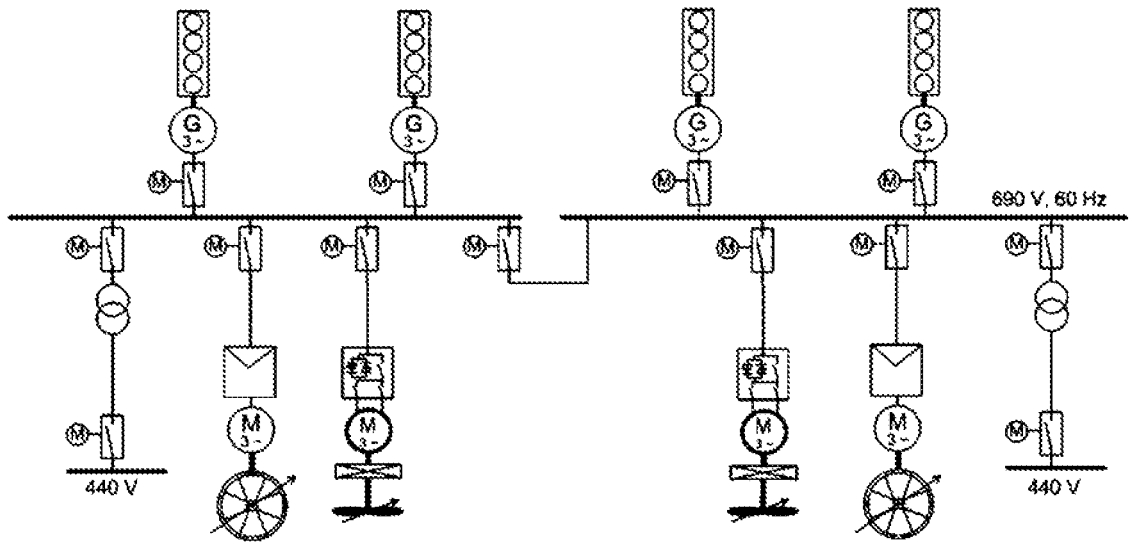
[FIG. 6]
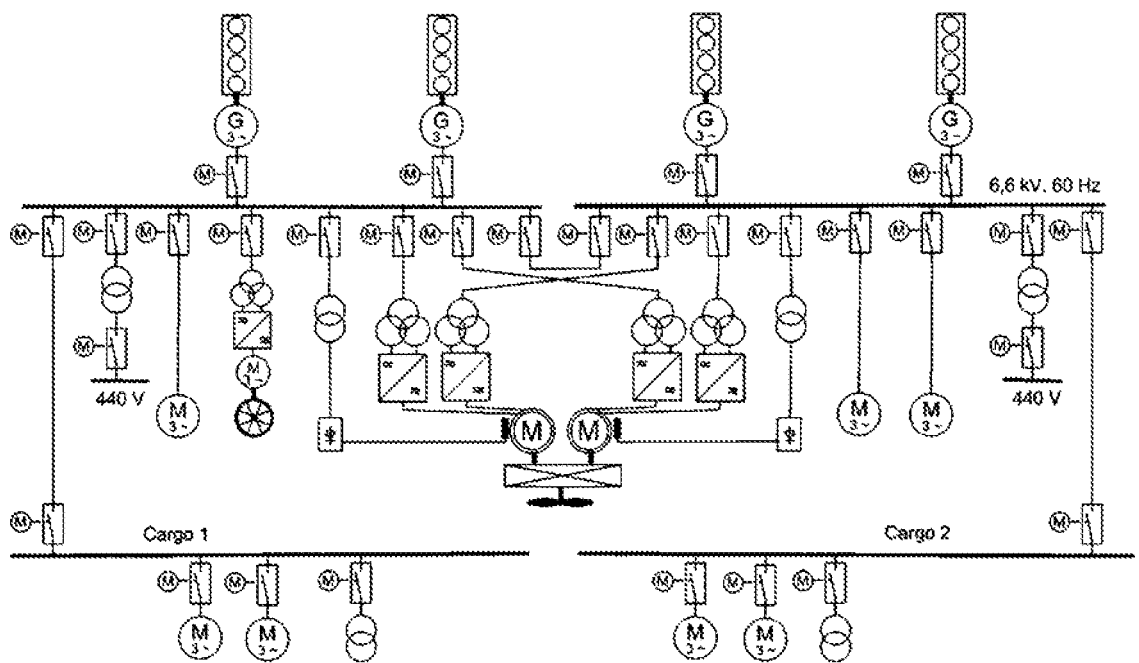

[FIG. 7]
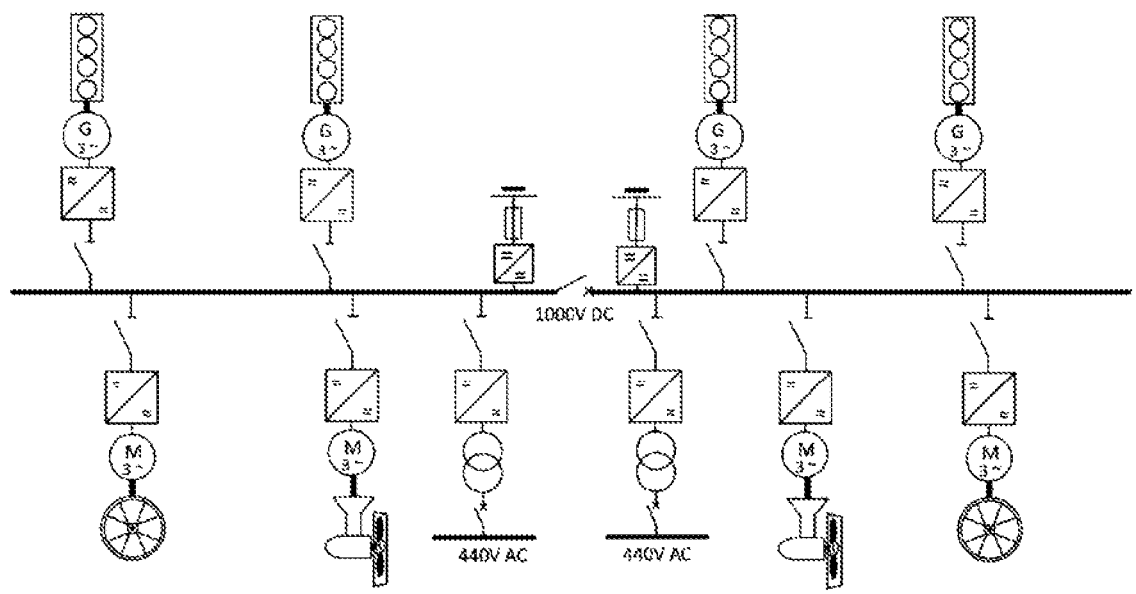
[FIG. 8]
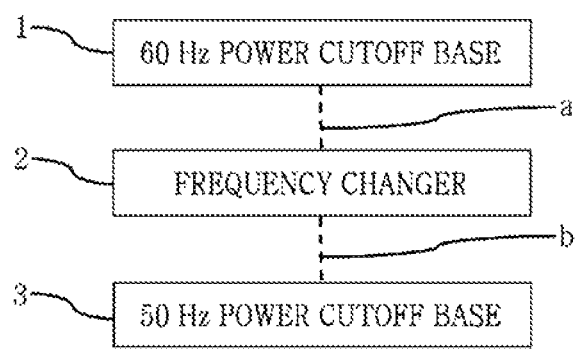

[FIG. 9]
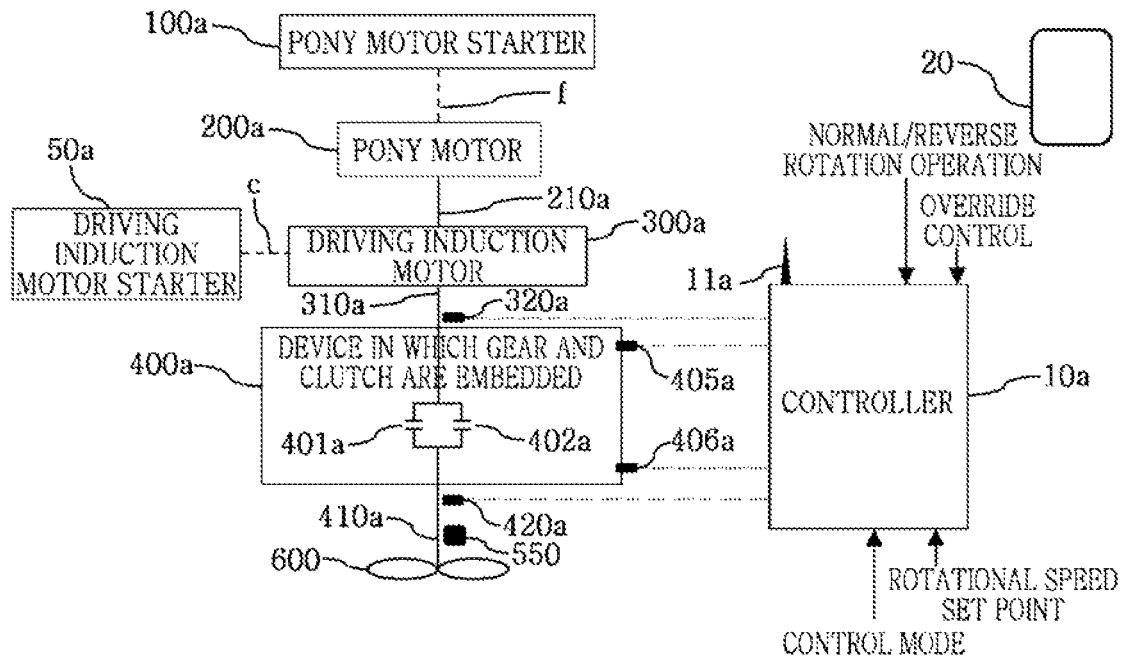
[FIG. 10]
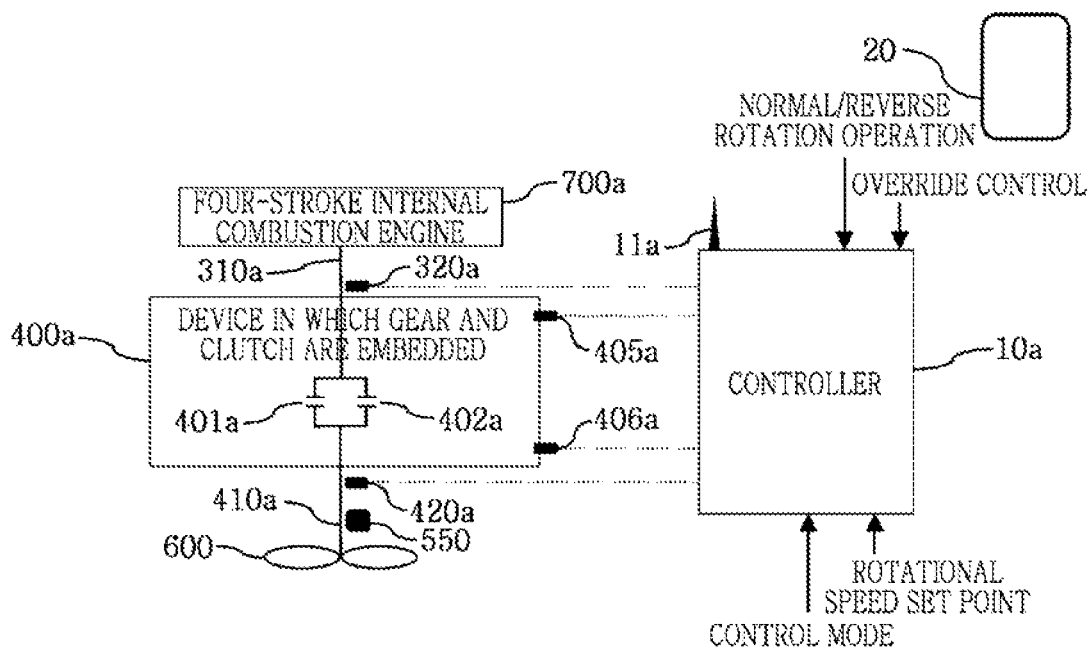

[FIG. 11]
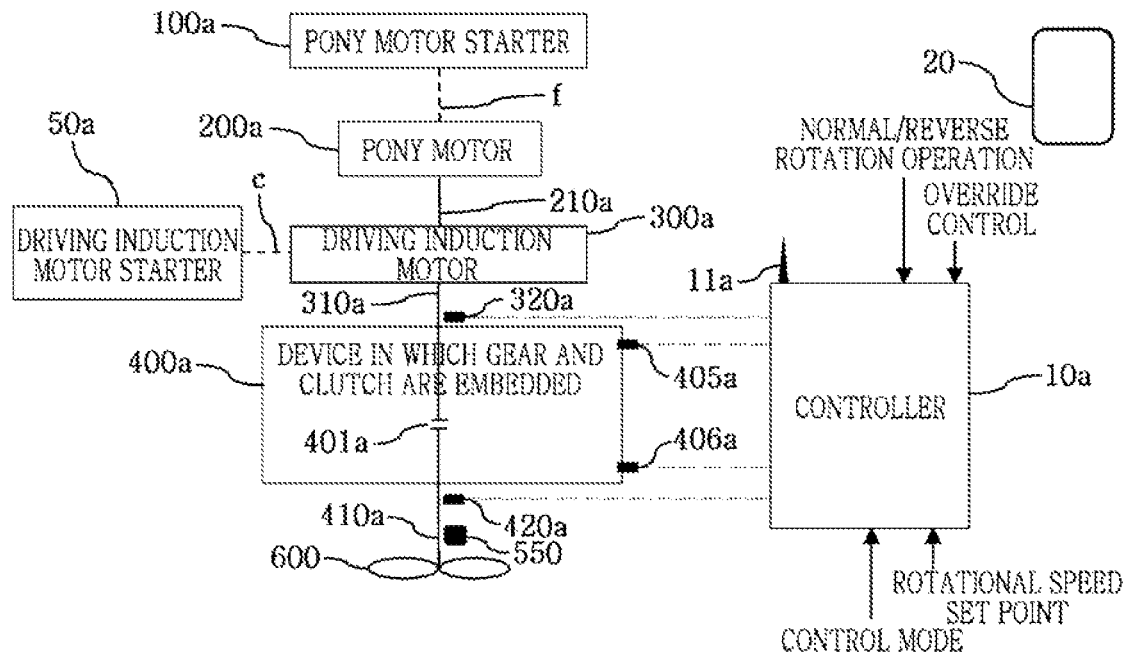
[FIG. 12]
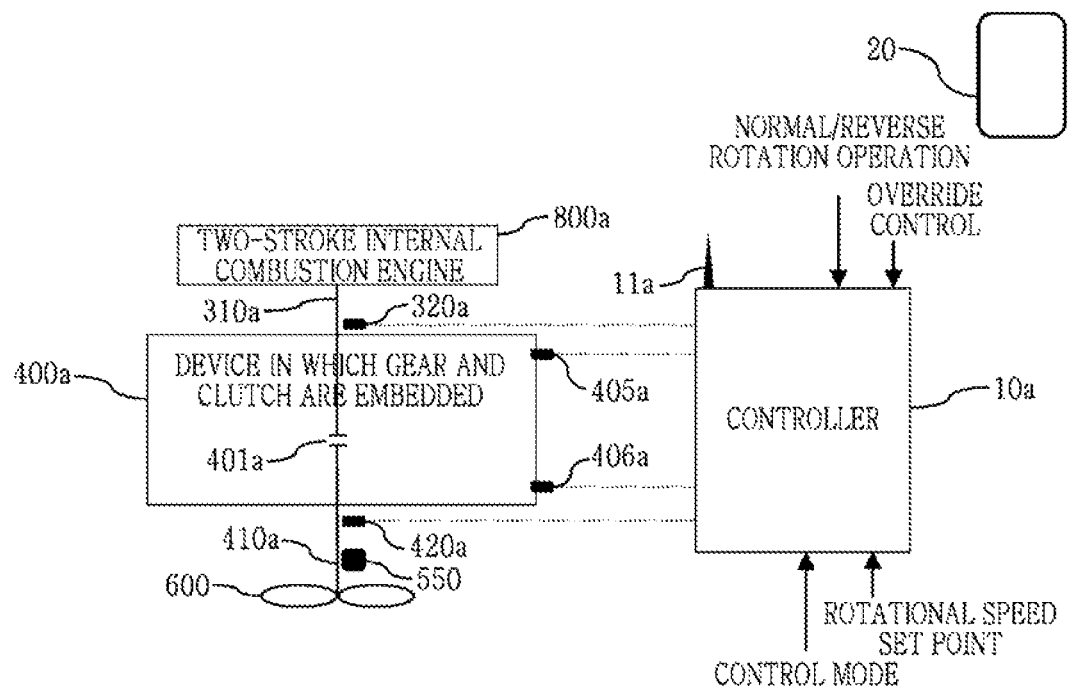

[FIG. 13]
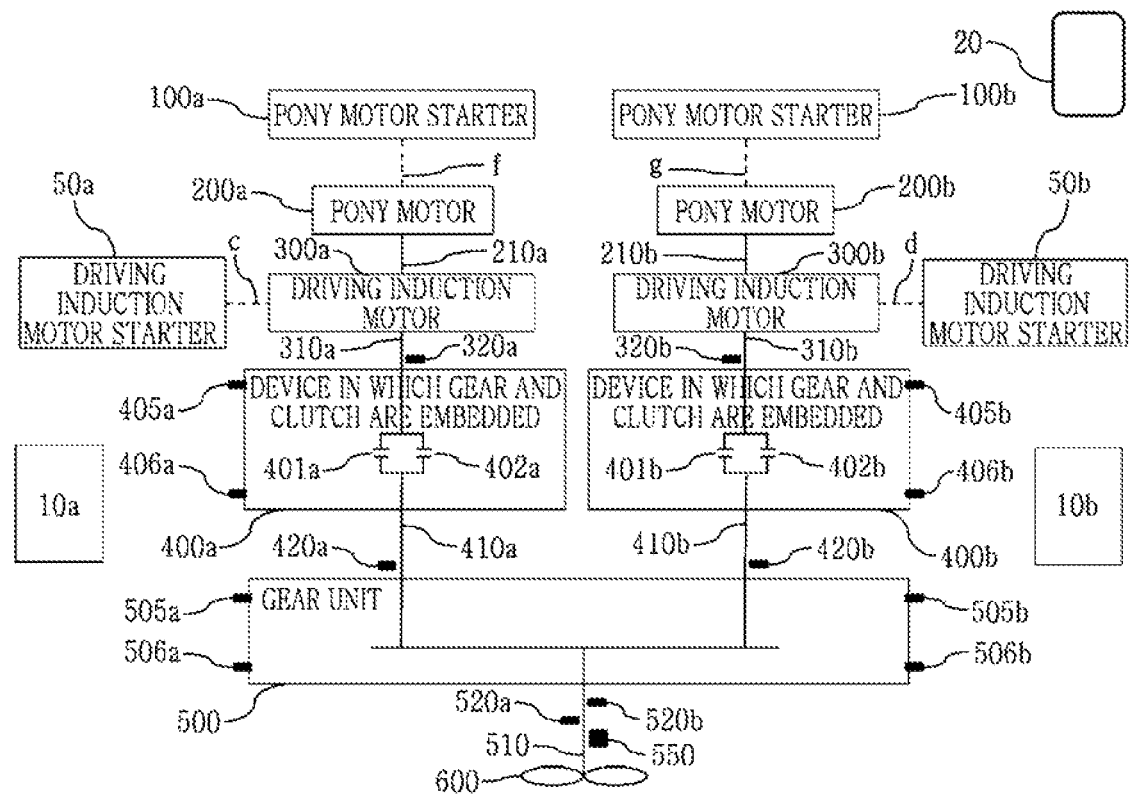
[FIG. 14]
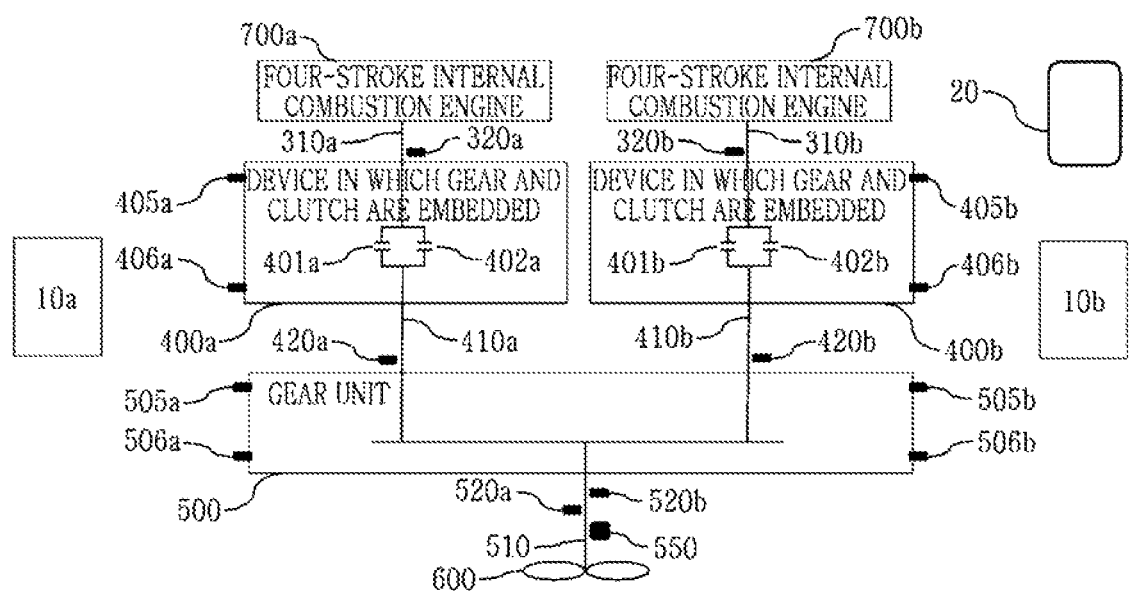

[FIG. 15]
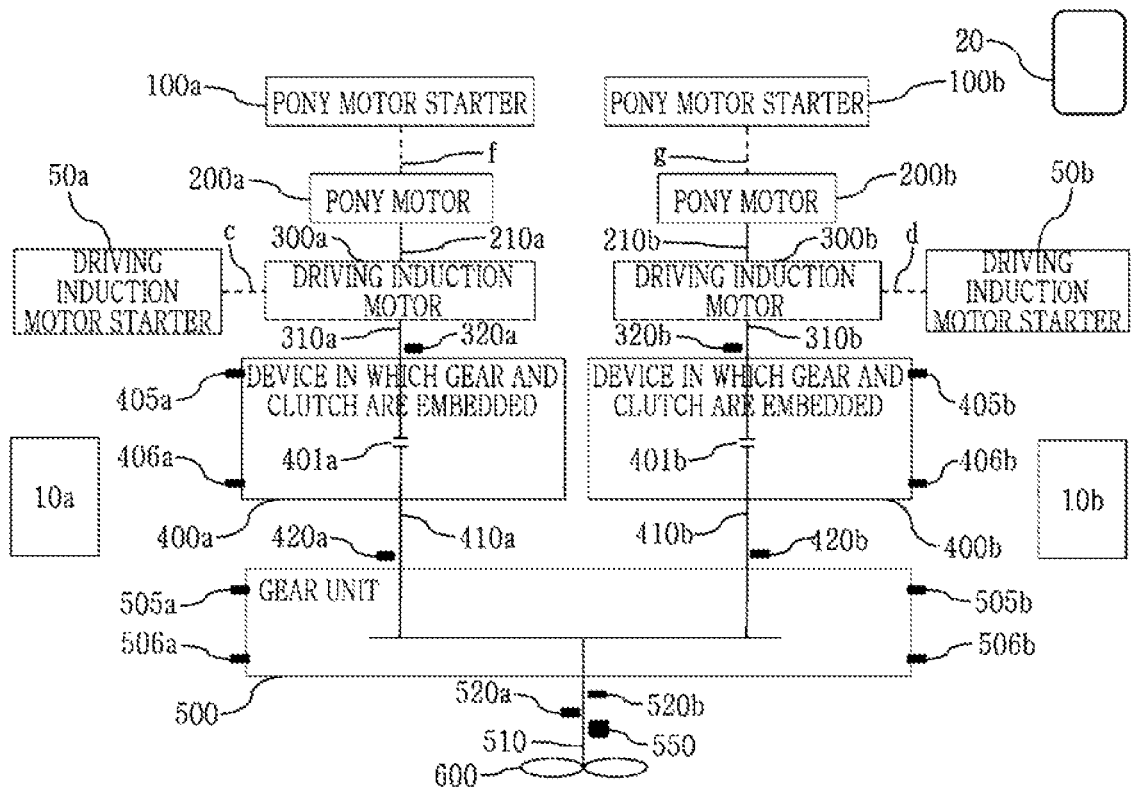
[FIG. 16]
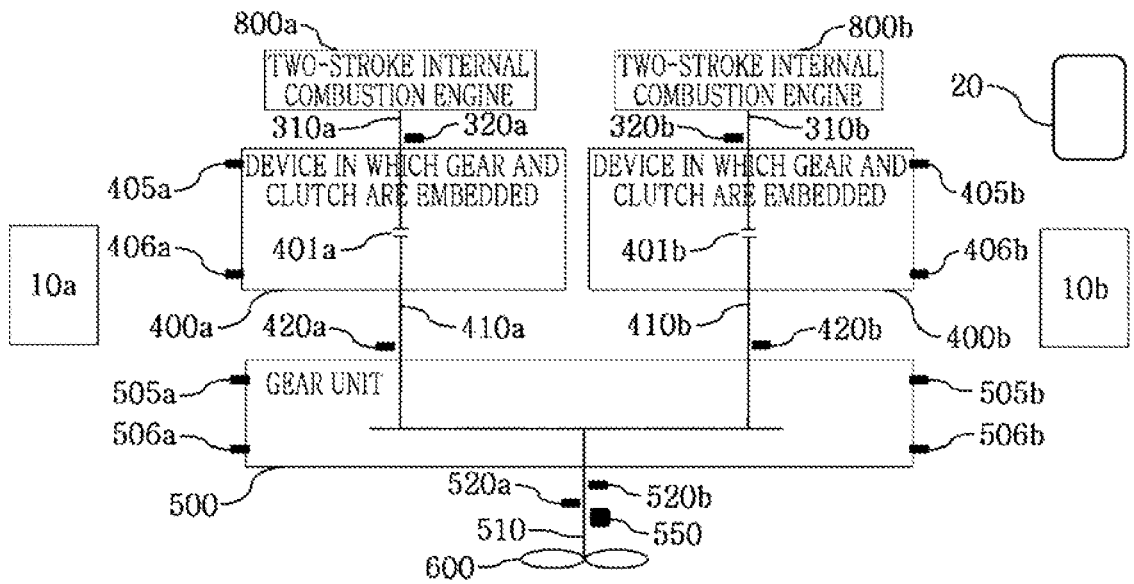

[FIG. 17]
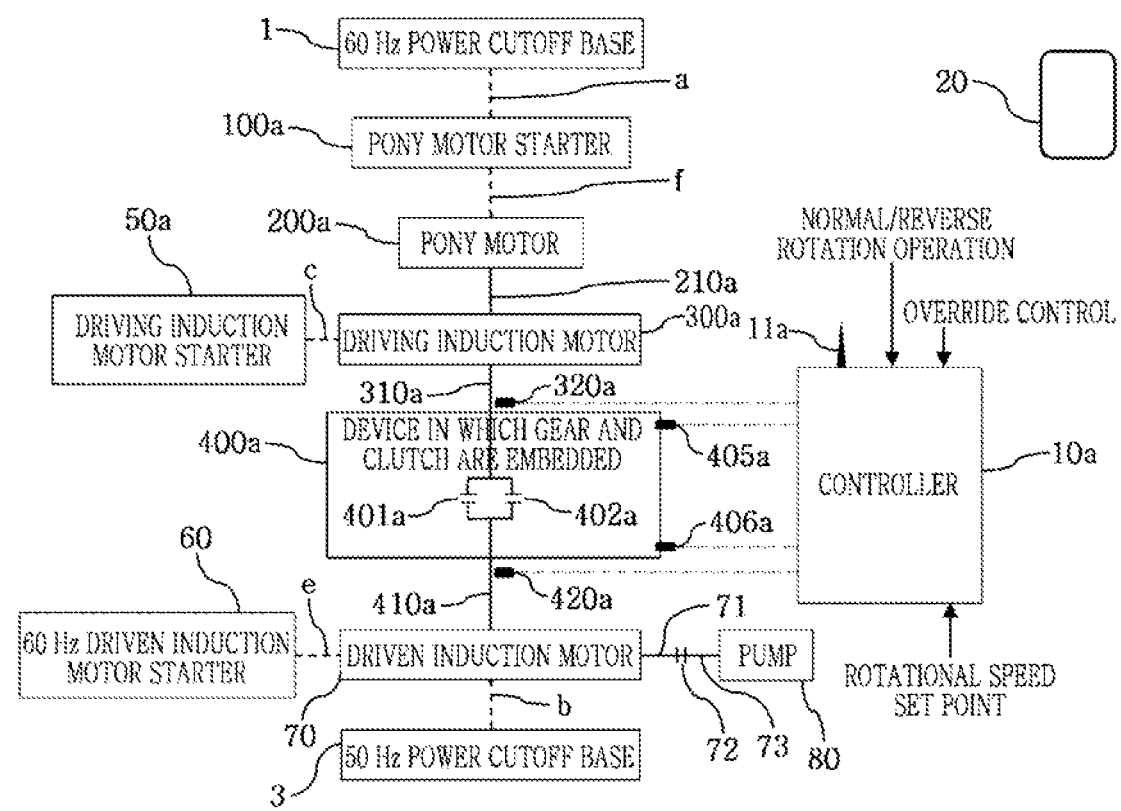

PROPULSION AND BRAKING SYSTEM USING CLUTCH

TECHNICAL FIELD

The present disclosure relates to a propulsion and braking system using a clutch and, more particularly, to a propulsion and braking system using a clutch, which enables economical and efficient propulsion and braking without a power converter, a controllable pitch propeller (CPP), and a friction brake used for the propulsion and braking of a vessel, and can also be applied to a vehicle.

BACKGROUND ART

A propeller used as a device for changing a rotational force into a propulsive force is used for the propulsion and braking of a vessel. Propellers may be classified into a controllable pitch propeller in which a pitch of a blade installed at an end of a shaft is adjustable, and a fixed pitch propeller (FPP) in which the pitch of the blade is not adjustable.

Even if the rotational speed of a shaft driving body is constant, the propulsion speed of a CPP vessel varies depending on the pitch angle of a propeller blade. In order to prevent an overload of the shaft driving body which occurs when a load amount required from the propeller is greater than a force generated according to the rotational speed of the shaft driving body, the output for the rotational speed of the shaft driving body and the pitch angle of the propeller blade should be controlled in conjunction with each other. The propulsion (forward and reverse) and braking of the vessel are facilitated by adjusting the pitch angle of the propeller blade controlled in conjunction with the output of the shaft driving body, but has a drawback in that a system for adjusting the pitch angle of the propeller blade is expensive.

The propulsion speed of an FPP vessel varies depending on the rotational speed of the shaft driving body. The FPP vessel is manufactured such that a load amount of the FPP for a rotational speed is smaller than an output of the shaft driving body for the rotational speed. The propulsion and braking of the vessel are facilitated by adjusting the rotational speed and the rotational direction of the shaft driving body. When a strong braking force is required, a friction brake may be additionally installed on a propeller shaft. When one desires to stop and reverse the FPP vessel, the propeller is rotated in a reverse direction, unlike the CPP vessel. When the shaft driving body is a 2-stroke internal combustion engine, the internal combustion engine may be rotated in a reverse rotational direction, so that a separate device is not required. When the shaft driving body is a 4-stroke internal combustion engine, the rotational direction may not be reversed. Thus, a reducer may be configured to have a function of changing the rotational direction of the propeller. In the case of a FPP vessel, since a system for adjusting the pitch angle of the propeller blade is not required, the cost of a product is inexpensive.

Generally, in the case of a vessel propelled by the 2-stroke internal combustion engine, the rated rotational speed of the internal combustion engine is the same as the rotational speed of the propeller of the vessel for full admission. Therefore, the reducer is not required. In the case of a vessel propelled by the 4-stroke internal combustion engine, the rated rotational speed of the internal combustion engine is faster than the rotational speed of the propeller of the vessel for achieving the full admission. Therefore, the reducer is required.

As for an electric propulsion vessel, the FPP is used when the rotational speed and rotational direction of the motor may be controlled using the variable speed power converter, and the CPP is used when the rotational speed and rotational direction of the motor cannot be controlled because a non-shiftable power converter which supplies only a sine wave is used. In the case of using the non-shiftable power converter which supplies only the sine wave, the rotational speed of the motor may be controlled using a pole-changing (high speed, medium speed) induction motor. Furthermore, in order to cope with the failure of the variable speed power converter or the non-shiftable power converter which supplies only the sine wave, power may be supplied to the motor by a bypass power supply device.

On the other hand, electric propulsion vessels may be classified into a vessel which does not use the reducer for reducing the rotational speed of the shaft driving body to match the rotational speed of the propeller and a vessel which uses the reducer. In the vessel which does not use the reducer, when the rotational speed of the propeller is 100 rpm, the rotational speed of the motor should be equal to the rotational speed of the propeller. Thus, a 72-pole motor is used if the used frequency is 60 Hz, and a 60-pole motor is used if the used frequency is 50 Hz. In the vessel using the reducer, when an 8-pole (900 rpm) motor is used at 60 Hz and a 6-pole (1,000 rpm) motor is used at 50 Hz, the rotational speed of the propeller being 100 rpm, the reducer having the ratio of 9:1 is used for 60 Hz, and the reducer having the ratio of 10:1 is used for 50 Hz. The larger the vessel is, the lower the rotational speed of the vessel propeller is. When the motor is designed to coordinate with the rotational speed of the propeller of the vessel, the diameter of the motor is increased and a price is also increased. In this regard, the reducer is used to reduce the rotational speed of the motor to 1,000 rpm or less such that the rotational speed of the motor matches the rotational speed of the propeller.

In the case of the electric propulsion vessel, the more the number of stages involving an electric product used to supply power to the motor is, the greater the loss is. The power converter should be operated in a space in which a cooling device is installed. In the case of a high-output product, a water-cooled cooler is required to cool heat generated from the device, and the cost of the product is high compared to convenience.

A clutch is used to connect or disconnect toque (i.e., power) between a driving body and a driven body. The 2-stroke internal combustion engine does not use the clutch because starting torque is larger than starting torque required by the propeller, and the 4-stroke internal combustion engine requires the clutch to start the internal combustion engine because starting torque is smaller than starting torque required by the propeller.

Furthermore, since a phenomenon where the shaft driving body stops may occur when the torque of the shaft driving body is smaller than the starting torque required by the driven body, the clutch is engaged at a time when the torque (i.e., rotational speed) of the shaft driving body is larger than the starting torque required by the driven body. The electric propulsion vessel adjusts the rotational speed using the variable speed power converter capable of adjusting the motor starting torque. Since the starting torque of the motor may be set to be larger than the starting torque required by the propeller, the clutch is not generally used between the motor and the reducer.

The reducer is used when the rotational speed of the driving body is different from the rotational speed of the driven body. A single input-single output reducer is configured such that one driven body is connected to one driving body. A multi input-single output reducer may be used in cases where a single driving body causes the size of a product to be excessively increased or impairs operational reliability. The multi input-single output reducer is configured such that one driven body is connected to several driving bodies. A synchronization process should precede a parallel operation between driving bodies.

In the case of a two-CPP and one-screw vessel that is propelled by two 4-stroke internal combustion engines, a dual input-single output clutch-embedded reducer is used. In order to increase the speed of the vessel when the vessel is operating at low speed by one internal combustion engine with a small pitch angle of the propeller blade, the remaining internal combustion engine should be connected through the clutch-embedded reducer. In order to minimize impact torque generated here, synchronization is required to match the rotational speed of the internal combustion engine which is operated under load and the rotational speed of the internal combustion engine which is to be connected. To this end, after the synchronization is completed by regulating, through a speed regulator, the rotational speed of the to-be-connected internal combustion engine to match the rotational speed of the internal combustion engine which transmits power. Then, the clutch of the clutch-embedded reducer is engaged to enable the parallel operation of the internal combustion engines, and the pitch angle of the blade is controlled to increase.

In the case of a two-FPP and one-screw vessel that is propelled by two 4-stroke internal combustion engines, a dual input-single output clutch-embedded reducer is used. An overload is generated if one internal combustion engine is used, because the pitch angle of the propeller blade may not be regulated. In this regard, the parallel operation is performed under low load by two internal combustion engines before operation under normal load. To this end, after the clutch of the clutch-embedded reducer is engaged in the state where one internal combustion engine is idle, the remaining internal combustion engine should be connected through the clutch-embedded reducer. In order to minimize impact torque generated here, synchronization is required to match the rotational speed of the internal combustion engine which is operated under load and the rotational speed of the internal combustion engine which is to be connected. To this end, after the synchronization is completed by regulating, through a speed regulator, the rotational speed of the to-be-connected internal combustion engine to match the rotational speed of the internal combustion engine which transmits power, the clutch of the clutch-embedded reducer is engaged to perform the parallel operation of the internal combustion engines and simultaneously the rotational speed of the internal combustion engine is controlled to increase.

In the case of a two-CPP and one-screw vessel that propelled by two motors, a dual input-single output reducer is used. In this case, the clutch is not used between the motor and the reducer. In order to increase the speed of the vessel in a state where the vessel is operating at low speed by one motor with a small pitch angle of the propeller blade, the remaining motors should be connected. To this end, the synchronization and parallel operation of the motors are controlled through the variable speed power converter, and the pitch angle of the blade is increased after the parallel operation of the motors is performed. When the clutch is not used between the dual input-single output reducer and the motor, even if the vessel is operated by one motor, rotors of the other idle motor may be rotated. Since this acts as the load of the operating motor and causes the loss of energy, the clutch may be installed.

In the case of a two-FPP and one-screw vessel electrically propelled by two motors, a dual input-single output reducer is used and a clutch is not used between the motor and the reducer. In this case, an overload may occur if one motor is used, because the pitch angle of the propeller blade may not be regulated. In this regard, the parallel operation is performed under low load by the two motors before operating under normal load. To this end, the synchronization and parallel operation of the motors are controlled through the variable speed power converter. When the two motors are operated, they are simultaneously operated from a low load to a high load to increase or reduce the speed of the vessel to the motor rotational speed. The efficiency of the motor is reduced as the rotational speed is reduced and the load is reduced. Thus, when the motor is operated at a low-speed and under low load, the overall efficiency of the operation may be deteriorated.

In the case of the induction motor receiving power from a generator, the general induction motor may be used. However, in the case of the induction motor receiving power from the variable speed power converter, a variable speed power converter-dedicated induction motor should be used instead of the general induction motor. Generally, the variable speed power converter-dedicated induction motor is 10 to 20% more expensive than the general induction motor having the same RPM.

A vessel which is at sea may not be easily moved by inertia. If there is a risk of crash while the vessel is sailing at full admission, reverse propulsion should be generated to make a crash stop. However, despite the crash stop, the vessel continues to move a certain distance by inertia, which is called a crash shortest stopping distance. This crash shortest stopping distance is calculated based on a distance traveled until a hull stops. This distance varies depending on the characteristics and type of a vessel, and it is generally about 6 to 12 times the length of the vessel.

In order to generate reverse propulsion for braking in a situation where the FPP vessel propelled by the 2-stroke internal combustion engine is moving forward at full admission, the propeller should be rotated reversely. If the supply of fuel to the internal combustion engine is blocked, the internal combustion engine braking occurs but the internal combustion engine is continuously rotated by the inertia of the propeller due to the speed of the advancing vessel. Therefore, only after the speed of the vessel is sufficiently reduced the internal combustion engine may stop and then start for reverse movement by starting air, the internal combustion engine may overcome the vessel's forward thrust and succeed in reverse starting. The maximum internal combustion engine rotational speed for forward thrust capable of reverse starting is determined by an internal combustion engine manufacturer.

In order to generate reverse propulsion for braking in a situation where the FPP vessel propelled by the 4-stroke internal combustion engine is moving forward at full admission, the propeller should be rotated reversely. Since the 4-stroke internal combustion engine may not be rotated reversely, the rotational speed is reduced to the clutch engagement rotational speed capable of changing the output shaft rotational direction of the clutch-embedded reducer and then the clutch is engaged. If the target rotational speed of the internal combustion engine is changed, for rapid reversing, to a rotational speed at which the clutch may be engaged, internal combustion engine braking occurs. However, in this case, the internal combustion engine is continuously rotated by the inertia of the propeller due to the speed of the advancing vessel. Therefore, after the speed of the vessel is reduced to some extent such that the clutch for changing the output shaft rotational direction of the clutch-embedded reducer may be engaged. Then, the clutch is engaged to reverse the rotational direction of the propeller. The maximum clutch engagement rotational speed of the clutch embedded reducer for forward thrust capable of reverse rotation is determined by an internal combustion engine manufacturer and a clutch embedded reducer manufacturer.

In order to generate reverse propulsion for braking in a situation where the FPP vessel propelled by the induction motor is moving forward at full admission, the propeller should be rotated reversely. Since the induction motor may control reverse rotation with a variable speed power converter, the induction motor is reduced to some extent and then is rotated reversely. Even after power supplied to the induction motor is reduced by the variable speed power converter, the induction motor is continuously rotated due to the inertia of the propeller by the vessel's speed. At this time, power generated in the induction motor is recovered using regenerative braking. However, unless the generated power is immediately recovered through the regenerative braking, the braking force is not generated. In this case, rheostatic braking is performed. After the speed of the vessel is reduced to some extent such that the induction motor may be rotated reversely. Then, the induction motor is rotated reversely by the variable speed power converter to reverse the rotational direction of the propeller. The maximum induction motor rotational speed for forward thrust capable of reverse rotation is determined by a motor manufacturer. As the time taken for the induction motor to stop is reduced, resistance used for rheostatic braking should be increased. In order to immediately cool heat generated during rheostatic braking, a separate cooler should be prepared for the variable speed power converter.

Furthermore, as the rotational speed of the induction motor is reduced, the rotational speed of a cooling fan is also reduced. Therefore, means capable of effectively cooling heat generated in the induction motor should be provided in the induction motor. If power supplied to the induction motor is reduced so as to reduce The inrush current that is generated when the induction motor is started by the variable speed power converter may be reduced by decreasing power supplied to the induction motor. However, in this case, starting time may be increased.

In the case where a fixed pitch propeller type side thruster (a bow thruster if it is installed at a bow, and a stern thruster if it is installed at a stern) which is an auxiliary thrust generator mounted on a side of the vessel so as to improve the handling performance of the vessel when berthing or disembarking the vessel, or an azimuth thruster which is used in an ice breaker or a dynamic positioning system is driven by a motor, a variable speed power converter is used.

If 50 Hz power is required where 60 Hz power is available, 60 Hz power is converted to 50 Hz through a frequency changer. If 60 Hz power is required where 50 Hz power is available, 50 Hz power is converted to 60 Hz through the frequency changer.

The CPP vessel is advantageous in that it is easier to operate when compared to the FPP vessel. However, the CPP vessel is disadvantageous in that a system for regulating the pitch angle of the propeller blade is expensive. The FPP electric propulsion vessel propelled by the motor using an expensive power converter requires an operation method capable of offsetting a loss generated during the low-speed rotation of the motor.

As described above, the conventional propulsion and braking method has various problems and limitations in the control and operation of a propulsive body. Accordingly, there is a need to develop a propulsion and braking system that can secure excellent equipment operation capability by improving reliability of equipment, increasing stability, and reducing investment and operating costs through the improvement of the propulsion and braking system.

SUMMARY

The present disclosure provides a propulsion and braking system using a clutch, which enables economical and efficient propulsion and braking without a power converter, a controllable pitch propeller, and a friction brake used for the propulsion and braking of a vessel, and can also be applied to a vehicle.

The present disclosure also provides a propulsion and braking system using a clutch, which can convert a frequency without using a conventional frequency changer used for frequency conversion.

In an aspect, a propulsion and braking system using a clutch is provided. The system includes a device including a clutch operation pressure-regulating valve, and a clutch and a gear which are configured to control a driven body and a driving body to rotate in a same direction and in opposite directions; and a control unit configured to regulate a rotational speed of the driven body to enable a continuous operation at a speed that is lower than a rated rotational speed using a slip of the clutch, and perform control so that engagement timing control of the clutch and engagement of the clutch are sustained if the driven body requires operation at the rated rotational speed or higher, wherein, when a braking signal is inputted into the control unit during propulsion of the driven body, the control unit removes an operation pressure of the clutch that is embedded in the device and is in operation, activates the clutch for reversing a rotational direction of the driven body, and regulates the operation pressure of the clutch by the valve to enable braking of a propulsive body.

In an aspect, a propulsion and braking system using a clutch is provided. The system includes a device including a clutch operation pressure-regulating valve, and a clutch and a gear which are configured to control a driven body and a driving body to rotate in a same direction and in opposite directions; and a control unit configured to regulate a rotational speed of the driven body to enable a continuous operation at a speed that is lower than a rated rotational speed using a slip of the clutch, and perform control so that engagement timing control of the clutch and engagement of the clutch are sustained if the driven body requires operation at the rated rotational speed or higher, wherein, when a braking signal is inputted into the control unit during propulsion of the driven body, the control unit removes an operation pressure of the clutch embedded in the device, switches the rotational direction of the driving body to reverse rotation, and then regulates the operation pressure of the clutch by the valve so as to enable the control of braking of a propulsive body.

The gear of the device may have a gear ratio corresponding to a difference in rotational speed between the driving body and the driven body.

The device may further include a gear unit having a gear ratio corresponding to a difference in rotational speed between the driving body and the driven body.

When the device is connected to a multi-input gear unit to perform a parallel operation between driving bodies, a synchronization process may not be required.

When the rotational speed of the driving body is increased in a state where the clutch of the device is engaged, the rotational speed of the driven body may be increased and a load of the driven body may be increased, and the control unit may compare an overload operable range with a current output amount of the driving body, the device, and the driven body, warn an operator when a compared result exceeds a preset value, and control the driving body, the device, and the driven body to operate within the overload operable range.

In a state where the clutch of the device is engaged or the clutch of the device is regulated by the valve to transmit power, the control unit may compare an output amount for the rotational speed of the driving body with a load amount for the rotational speed of the driven body, and may warn an operator that the load amount for the rotational speed of the driven body is increased when the output amount for the rotational speed of the driving body is increased compared to the load amount for the rotational speed of the driven body, and when the output amount for the rotational speed of the driving body is reduced compared to the load amount for the rotational speed of the driven body, the control unit may warn the operator that the load amount for the rotational speed of the driven body is reduced.

A lubricant pressure of the device may be reduced as a lubricant temperature is increased, and the control unit may learn a change amount of the lubricant pressure according to the lubricant temperature and check stability of a lubricant viscosity.

The control unit may determine a clutch wear degree based on a magnitude of a difference in rotational speed between an input shaft of the device and an output shaft of the device in a state where the clutch of the device is engaged, and determine the clutch wear degree based on a magnitude of a difference between a change amount of a set point transmitted to the valve to keep the rotational speed of the driven body constant in a state where the clutch of the device is not engaged and a variation value according to a change in the lubricant temperature, when the change amount exceeds the variation value.

The control unit may detect a stick slip phenomenon occurring in a torque transmission process between the driving body and the driven body in the state where the clutch of the device is not engaged, and control the operation pressure of the clutch.

The control unit may keep the rotational speed of the driven body constant when the control mode is a speed control mode, and keep a load applied to the driving body constant when the control mode is a load control mode.

When the lubricant temperature of the device increases above a permissible value in a state where the clutch of the device is not engaged and an override control function of the control unit is activated, the control unit may switch from a rotational speed control to a constant lubricant temperature control, and return to the rotational speed control if the lubricant temperature is reduced within a hysteresis of an alarm value.

When a sudden increase in a transient load of the driven body is detected, the control unit may reduce a load of the driving body by regulating a set point of the valve to increase a slip depending on a load reduction amount of the driven body which is preset according to a sudden increase amount of a driving force, such that the rotational speed of the driving body is recovered within a rotational speed recovery time, which is permitted in a performance-class operation limit value for rotational speed transient characteristics depending on a magnitude of the sudden increase in the transient load, and may gradually return the set point of the valve to an original set point if recovery of the rotational speed is detected.

The control unit may control the clutch of the device and a friction brake in conjunction with each other during a brake control.

The control unit may regulate time required for propulsion and braking by regulating an operating time of the valve with a change gradient of the rotational speed set point.

An induction motor may be used as the driven body and a rotational speed of the induction motor may be controlled by the control unit such that the induction motor is used as an induction generator, and a phase rotational direction of the induction generator may be changeable if the device is configured to change the rotational direction of the driven body.

The control unit may be controlled through a remote wireless terminal.

Advantageous Effects

A propulsion and braking system using a clutch according to the present disclosure is advantageous in that a clutch that connects or disconnects power between a driving body and a driven body is used for the propulsion and braking of a propulsive body, so that investment cost and maintenance cost are reduced.

Furthermore, a propulsion and braking system using a clutch can be used for frequency conversion.

BRIEF DESCRIPTION OF THE DRAWINGS

FIG. 1 illustrates efficiency that changes according to a representative output power of a power converter.

FIG. 2 illustrates efficiency and power factor that change according to a representative rotational speed of an induction motor.

FIG. 3 illustrates slip, current, power factor, and efficiency that change according to a representative output power of an induction motor.

FIG. 4 illustrates a conventional electric propulsion system of a twin screw vessel propelled by an AC generator, a variable speed power converter, an induction motor, a single input-single output reducer, a fixed pitch propeller-type bow thruster, a fixed pitch propeller-type stern thruster, and a fixed pitch propeller.

FIG. 5 illustrates a conventional electric propulsion system of a twin screw vessel propelled by an AC generator, a non-shiftable power converter supplying only a sine wave, a pole-changing (high speed, medium speed) induction motor, a single input-single output reducer, a controllable pitch propeller-type bow thruster, a controllable pitch propeller-type stern thruster, and a controllable pitch propeller.

FIG. 6 illustrates a conventional electric propulsion system of a single screw vessel propelled by an AC generator, a variable speed power converter, a synchronous motor, a dual input-single output reducer, a fixed pitch propeller-type bow thruster or a stern thruster, and a fixed pitch propeller.

FIG. 7 illustrates a conventional electric propulsion system propelled by a frequency variable AC generator, a DC distribution system (including a rectifier, an inverter, and a battery), an induction motor, a fixed pitch propeller-type bow thruster, a fixed pitch propeller-type stern thruster, and a fixed pitch propeller-type azimuth thruster.

FIG. 8 illustrates a conventional method for converting a power frequency from 60 Hz to 50 Hz through a frequency changer.

FIG. 9 illustrates an embodiment in which a device having therein a clutch and a gear, capable of adjusting the rotational direction of an output side according to the present disclosure is driven by a driving induction motor.

FIG. 10 illustrates an embodiment in which a device having therein the clutch and the gear, capable of adjusting the rotational direction of the output side according to the present disclosure is driven by a 4-stroke internal combustion engine.

FIG. 11 illustrates an embodiment in which a device having therein a clutch and a gear, incapable of adjusting a rotational direction of an output side according to the present disclosure is driven by a driving induction motor.

FIG. 12 illustrates an embodiment in which a device having therein the clutch and the gear, incapable of adjusting the rotational direction of the output side according to the present disclosure is driven by a 2-stroke internal combustion engine.

FIG. 13 illustrates an embodiment in which a device having therein the clutch and the gear, capable of adjusting the rotational direction of the output side according to the present disclosure is driven by the driving induction motor, and is operated in parallel by a dual input-single output gear unit.

FIG. 14 illustrates an embodiment in which a device having therein the clutch and the gear, capable of adjusting the rotational direction of the output side according to the present disclosure is driven by a 4-stroke internal combustion engine, and is operated in parallel by a dual input-single output gear unit.

FIG. 15 illustrates an embodiment in which a device having therein the clutch and the gear, incapable of adjusting the rotational direction of the output side according to the present disclosure is driven by a driving induction motor, and is operated in parallel by a dual input-single output gear unit.

FIG. 16 illustrates an embodiment in which a device having therein the clutch and the gear, incapable of adjusting the rotational direction of the output side according to the present disclosure is driven by a 2-stroke internal combustion engine, and is operated in parallel by a dual input-single output gear unit.

FIG. 17 illustrates an embodiment in which a device having therein the clutch and the gear, capable of adjusting the rotational direction of the output side according to the present disclosure is driven by the driving induction motor, and produces power whose frequency is converted by a driven induction motor.

DESCRIPTION OF EXEMPLARY EMBODIMENTS

Hereinafter, an embodiment of the present disclosure will be described in detail with reference to the accompanying drawings. It should be noted that the same reference numerals are used throughout the drawings to designate the same or similar components. Further, when it is determined that the detailed description of the present disclosure may obscure the gist of the present disclosure, the detailed description will be omitted. Furthermore, although the embodiment of the present disclosure will be described below, the technical spirit of the present disclosure may be practiced by those skilled in the art without being limited thereto.

FIG. 1 illustrates efficiency that changes according to a representative output power of a power converter. In FIG. 1, it can be seen that the efficiency is sharply reduced at the load of about 15% or less. FIG. 2 illustrates efficiency and power factor that change according to a representative rotational speed of an induction motor. In FIG. 2, it can be seen that the efficiency and the power factor are reduced at a rated rotational speed or less. FIG. 3 illustrates slip, current, power factor and efficiency that change according to a representative output power of an induction motor. In FIG. 3, it can be seen that the efficiency is sharply reduced at the output power of about 50% or less.

FIG. 4 illustrates a conventional electric propulsion system of a twin screw vessel propelled by an AC generator, a variable speed power converter, an induction motor, a single input-single output reducer, a fixed pitch propeller-type bow thruster, a fixed pitch propeller-type stern thruster, and a fixed pitch propeller. When the propulsion speed of a vessel is low, operating losses increase due to a reduction in efficiency at the low output of the power converter of FIG. 1, a reduction in efficiency at the low rotational speed of the induction motor of FIG. 2, and a reduction in efficiency at the low output of the induction motor of FIG. 3.

FIG. 5 illustrates a conventional electric propulsion system of a twin screw vessel propelled by an AC generator, a non-shiftable power converter supplying only a sine wave, a pole-changing (high speed, medium speed) induction motor, a single input-single output reducer, a controllable pitch propeller-type bow thruster, a controllable pitch propeller-type stern thruster, and a controllable pitch propeller. When the propulsion speed of the vessel is low, among the operating losses due to a reduction in efficiency occurring in the electric propulsion system of FIG. 4, a reduction in the efficiency and the power factor at the low rotational speed of the induction motor of FIG. 2 may be offset by maintaining the rotational speed of the induction motor at the rated rotational speed and lowering the pitch angle of the controllable pitch propeller for propulsion. However, for this purpose, the controllable pitch propeller is required, which is expensive equipment.

FIG. 6 illustrates a conventional electric propulsion system of a single screw vessel propelled by an AC generator, a variable speed power converter, a synchronous motor, a dual input-single output reducer, a fixed pitch propeller-type bow thruster or a stern thruster, and a fixed pitch propeller. When the propulsion speed of the vessel is low, the operating losses may be caused by a reduction in efficiency occurring in the electric propulsion system of FIG. 4. In addition, in the case of two synchronous motors connected to the dual input-single output reducer, the two synchronous motors should be simultaneously operated in parallel regardless of the propulsion speed of the vessel, instead of an operating method where one synchronous motor is operated in a low-speed zone and two synchronous motors are operated in a high speed zone depending on the propulsion speed of the vessel. Thus, when the propulsion speed of the vessel is low, the loss of the synchronous motor is increased twice compared to the case where one synchronous motor is used.

FIG. 7 illustrates a conventional electric propulsion system propelled by a frequency variable AC generator, a DC distribution system (including a rectifier, an inverter, and a battery), an induction motor, a fixed pitch propeller-type bow thruster, a fixed pitch propeller-type stern thruster, and a fixed pitch propeller-type azimuth thruster. When the propulsion speed of the vessel is low, the operating losses due to a reduction in efficiency which has occurred in the electric propulsion system of FIG. 4 may be offset by additionally installing a rectifier, an inverter, and a battery in the frequency variable AC generator and thereby reducing fuel consumption of the internal combustion engine compared to the conventional AC generator. However, for this purpose, these expensive devices should be additionally used.

FIG. 8 illustrates a conventional method for converting a power frequency from 50 Hz to 60 Hz through a frequency changer. As a capacity required for power conversion increases, the cost of the frequency changer increases.

FIGS. 9 to 17 illustrate embodiments in which a device having therein a clutch and a gear, capable of adjusting the rotational direction of an output side or a device having therein a clutch and a gear, incapable of adjusting the rotational direction of an output side is driven by a driving body.

Although not shown in detail, referring to FIGS. 13 to 16, control units 10a and 10b may be connected to wireless communication antennas 11a and 11b, a forward/reverse rotation operation signal, an override control signal, a control mode signal, a rotational speed set point signal, input shaft speed sensors 320a and 320b of a device in which a clutch and a gear are embedded, lubricant temperature sensors 405a and 405b of the device in which the clutch and the gear are embedded, lubricant pressure sensors 406a and 406b of the device in which the clutch and the gear are embedded, output shaft speed sensors 420a and 420b of the device in which the clutch and the gear are embedded, lubricant temperature sensors 505a and 505b of a dual input-single output gear unit, lubricant pressure sensors 506a and 506b of the dual input-single output gear unit, and output shaft speed sensors 520a and 520b of the dual input-single output gear unit.

Furthermore, referring to FIGS. 9 to 16, when the rotational speed of the driving body is different from that of the driven body, the gear of the device in which the clutch and the gear are embedded may have a gear ratio corresponding to a difference in rotational speed, or a gear unit having a gear ratio corresponding to a difference in rotational speed may be separately provided on the front end or rear end of the device in which the clutch and the gear are embedded.

Before describing the operation and operating method of the propulsion and braking system using the clutch according to the present disclosure in detail with reference to the accompanying drawings, the characteristics of the control units 10a and 10b will be first described.

When the driven body is driven by the driving induction motor 300a or 300b to be propelled in the state where the clutch of the device 400a or 400b in which the clutch and the gear are embedded is engaged, an increase in the frequency of the power supplied from a driving induction motor starter 50a or 50b leads to an increase in the rotational speed of the driven body, so the load of the driving induction motor 300a or 300b increases. In this case, the control unit 10a or 10b compares the overload operable range and current output amount of the driving induction motor 300a or 300b, the device 400a or 400b in which the clutch and the gear are embedded, a dual input-single output gear unit 500, and a driven body 600 such as a FPP propeller, based on information acquired through a power metering and monitoring device (PMD) installed in the driving induction motor starter 50a or 50b. When this exceeds a preset value, the control unit warns an operator so that the devices are operated within the overload operable range.

Furthermore, when the driven body is driven by the internal combustion engines 700a, 700b, 800a, and 800b to be propelled in the state where the clutch of the device 400a and 400b in which the clutch and the gear are embedded is engaged, an increase in the rotational speed of the internal combustion engines 700a, 700b, 800a, and 800b leads to an increase in the rotational speed of the driven body, so the load of the internal combustion engines 700a, 700b, 800a, 800b increases. In this case, the control units 10a and 10b compare the overload operable range and current output amount of the internal combustion engines 700a, 700b, 800a, and 800b, the devices 400a and 400b in which the clutch and the gear are embedded, the dual input-single output gear unit 500, and the driven body 600 such as a FPP propeller, based on information acquired through a control device of the internal combustion engine. When the load exceeds a preset value, the control unit warns an operator so that the devices are operated within the overload operable range.

Further, in the state where the clutch of the device 400a or 400b in which the clutch and the gear are embedded is engaged or in the state where the clutch of the device 400a or 400b in which the clutch and the gear are embedded is regulated by a clutch operation pressure-regulating valve to transmit power, the control unit 10a or 10b compares the output amount for each rotational speed of the driving induction motor 300a or 300b and the internal combustion engine 700a, 700b, 800a, or 800b and the load amount for the rotational speed of the driven body 600. In the case where the output amount for each rotational speed of the driving induction motor 300a or 300b and the internal combustion engine 700a, 700b, 800a, or 800b is increased compared to a load amount for the rotational speed of the driven body 600, the control unit 10a or 10b warn an operator that the load amount for the rotational speed of the driven body 600 is increased. In the case where the output amount for each rotational speed of the driving induction motor 300a or 300b and the internal combustion engine 700a, 700b, 800a, or 800b is reduced compared to the load amount for the rotational speed of the driven body 600, the control unit 10a or 10b warns an operator that the load amount for the rotational speed of the driven body 600 is reduced. Here, the output amount for the rotational speed of the driving body is based on information acquired through the power metering and monitoring device installed in the driving induction motor starter 50a or 50b when the driving body is the driving induction motor 300a or 300b. When the driving body is the internal combustion engine 700a, 700b, 800a, or 800b, it is determined whether the load amount of the driven body 600 is increased or reduced based on the information acquired through the internal combustion engine control device. When foreign substance adheres to the driven body 600 and thereby resistance increases, the load amount increases. When the driven body 600 is worn out and thereby resistance reduces, the load amount reduces.

Furthermore, the lubricant pressure of the device 400a or 400b in which the clutch and the gear are embedded tends to decrease as the lubricant temperature of the device increases. Therefore, the control unit 10a or 10b measures the lubricant temperature and pressure of the device using the lubricant temperature sensor 405a or 405b and the lubricant pressure sensor 406*a* or 406*b*, and then learns the change amount of measured values to check the stability of lubricant viscosity.

Further, in the state where the clutch of the device 400*a* or 400*b* having the clutch and the gear embedded therein is engaged, when the rotational speed measured by the input shaft speed sensor 320*a* or 320*b* installed on the input shaft 310*a* or 310*b* of the device is different from the rotational speed measured by the output shaft speed sensor 420*a* or 420*b* installed on the output shaft 410*a* or 410*b* of the device, the control unit 10*a* or 10*b* may determine a clutch wear degree based on the magnitude of the difference.

Furthermore, in order to keep the rotational speed of the driven body 600 constant in the state where the clutch of the device 400*a* or 400*b* having the clutch and the gear embedded therein is not engaged, a set point transmitted from the control unit 10*a* or 10*b* to the clutch operation pressure-regulating valve is changed as the lubricant pressure is changed. When the change amount of the set point exceeds a change amount due to a change in lubricant temperature, the clutch wear degree may also be determined by the magnitude of the difference.

Further, the control unit 10*a* or 10*b* detects the occurrence of a stick slip phenomenon in a situation where the rotational speed of the driven body is too low or the rotational speed of the driven body is close to the rotational speed of the driving body when the slip of the clutch occurs, by analyzing the angular speed for the rotational speed measured by the input shaft speed sensor 320*a* or 320*b* installed on the input shaft 310*a* or 310*b* of the device having the clutch and the gear embedded therein and the output shaft speed sensor 420*a* or 420*b* installed on the output shaft 410*a* or 410*b* of the device. Then, the control unit 10*a* or 10*b* uses the detected result as a hydraulic control correction factor required for the operation of the clutch such that the detected result is reflected in a clutch operation hydraulic determination circuit or a rotational speed determination circuit. As a result, the set point of the clutch operation pressure-regulating valve may be increased or decreased, and thus the stick slip may be avoided.

Furthermore, the control unit 10*a* or 10*b* performs control to keep the rotational speed of the driven body constant in a speed control mode when the driving body is the driving induction motor 300*a* or 300*b*, and performs control to keep a load applied to the driving induction motor 300*a* or 300*b* constant based on information acquired through the power metering and monitoring device installed in the driving induction motor starter 50*a* or 50*b* in a load control mode.

Further, when the driving body is the internal combustion engine 700*a*, 700*b*, 800*a*, or 800*b*, the control unit performs control to keep the rotational speed of the driven body constant in the speed control mode, and performs control to keep the load applied to the internal combustion engine 700*a*, 700*b*, 800*a*, or 800*b* constant, based on information acquired through the internal combustion engine control device in the load control mode.

Furthermore, in a state where the clutch of the device 400*a* or 400*b* having the clutch and the gear embedded therein is not engaged and an override control function is activated, if the lubricant temperature of the device 400*a* or 400*b* measured by the lubricant temperature sensor 405*a* or 405*b* increases above a permissible value due to the failure of a lubricant cooling device, the control unit 10*a* or 10*b* converts the control of the device 400*a* or 400*b* from a rotational speed control to a constant lubricant temperature control. If the lubricant temperature of the device 400*a* or 400*b* having the clutch and the gear embedded therein is reduced within the hysteresis of an alarm value, the control unit 10*a* or 10*b* returns to the rotational speed control.

Furthermore, in the case where the driving body is the driving induction motor 300*a* or 300*b*, if the transient load of the driven body is suddenly increased, the rotational speed of the internal combustion engine supplying power is reduced, and the frequency supplied from the driving induction motor starter 50*a* or 50*b* to the driving induction motor 300*a* or 300*b* is lowered. In this case, a sudden increase amount ($\Delta$ p/$\Delta$ t) of power may be detected by a rotational speed change amount ($\Delta$ rpm/$\Delta$ t) measured by the input shaft speed sensor 320*a* or 320*b* installed on the input shaft 310*a* or 310*b* of the device, a frequency change amount per time ($\Delta$ frequency/$\Delta$ t) acquired through the power metering and monitoring device installed on the driving induction motor starter 50*a* or 50*b*, or an effective power change amount per time ($\Delta$ kw/$\Delta$ t) acquired through the power metering and monitoring device installed in the driving induction motor starter 50*a* or 50*b*. The control unit 10*a* or 10*b* may detect a sudden increase in the transient load of the above-described driven body, and may recover a frequency within a frequency recovery time after load increase, which is permitted in a performance-class operation limit value for frequency transient characteristics of the internal combustion engine supplying power depending on the magnitude of the sudden increase in the transient load. That is, the control unit 10*a* or 10*b* regulates the set point of the clutch operation pressure-regulating valve to increase the slip depending on a preset load reduction amount of the driven body according to the sudden increase amount of power and reduce the load of the internal combustion engine, thus causing the rotational speed of the power supplying internal combustion engine to be rapidly recovered. Thereafter, if the recovery of the rotational speed is sensed, the set point of the clutch operation pressure-regulating valve is gradually returned to an original set point again.

Further, in the case where the driving body is the internal combustion engine 700*a*, 700*b*, 800*a*, or 800*b*, if the transient load of the driven body is suddenly increased, the rotational speed of the internal combustion engine 700*a*, 700*b*, 800*a*, or 800*b* supplying a driving force is reduced. In this case, a driving-force sudden increase amount ($\Delta$ p/$\Delta$ t) may be detected by the rotational speed change amount ($\Delta$ rpm/$\Delta$ t) measured by the input shaft speed sensor 320*a* or 320*b* installed on the input shaft 310*a* or 310*b* of the device. The control unit 10*a* or 10*b* may detect a sudden increase in the transient load of the above-described driven body, and may recover the rotational speed of the driving body within a rotational speed recovery time, which is permitted in the performance-class operation limit value for the rotational speed transient characteristics of the internal combustion engine 700*a*, 700*b*, 800*a*, or 800*b* supplying the driving force depending on the magnitude of the sudden increase in the transient load. That is, the control unit 10*a* or 10*b* regulates the set point of the clutch operation pressure-regulating valve to increase the slip depending on a preset load reduction amount of the driven body according to the sudden increase amount of the driving force and reduce the load of the internal combustion engine 700*a*, 700*b*, 800*a*, or 800*b*, thus causing the rotational speed of the internal combustion engine 700*a*, 700*b*, 800*a*, or 800*b* to be rapidly recovered. Thereafter, if the recovery of the rotational speed is detected, the set point of the clutch operation pressure-regulating valve is gradually returned to an original set point again.

Further, in the case where a friction brake 550 is installed on the output shaft 410*a* of the device 400*a* having the clutch and the gear embedded therein or the output shaft 510 of the dual input-single output gear unit, the friction brake 550 may be controlled in the conjunction with the clutch of the device 400*a* during the braking control. That is, if the braking signal is input and the clutch of the device 400*a* is disengaged, the control unit 10*a* or 10*b* operates the friction brake 550. If the reverse-rotation preparation of the driven body 600 is completed and the clutch operation pressure of the device 400*a* is adjusted, the operation of the friction brake 550 is released. If a propulsive body is stopped, the friction brake 550 is operated again.

Furthermore, the control unit 10*a* or 10*b* may regulate time required for the propulsion and braking by regulating the operating time of the clutch operation pressure-regulating valve with a change gradient of the input rotational speed set point.

Hereinafter, the operation and operating method of the propulsion and braking system using the clutch according to the present disclosure will be described in detail with reference to the accompanying drawings.

The device 400*a* or 400*b* having the clutch and the gear embedded therein, shown in FIGS. 9, 10, 13, 14, and 17, will be described on the premise that an input shaft/output shaft same rotational direction control clutch 401*a* or 401*b* is operated during the forward rotation of the propulsive body, and an input shaft/output shaft opposite rotational direction control clutch 402*a* or 402*b* is operated during the reverse rotation thereof.

FIG. 9 illustrates an embodiment in which the device 400*a* having the clutch and the gear, which may regulate the rotational direction of the driven body according to the present disclosure in the same direction as or in the opposite direction to the driving body is driven by the driving induction motor 300*a*. As a method for limiting starting current which is generated during the starting of the driving induction motor 300*a* used as the driving body, a small-sized induction motor is used as a pony motor 200*a*. If a full voltage is applied through a power supply cable f to the pony motor 200*a* with the pony motor starter 100*a* after a pony-motor output shaft 210*a* is connected to a shaft of the driving induction motor 300*a*, a rotor of the driving induction motor 300*a* may be rotated up to the rated rotational speed of the pony motor 200*a*. When it is also required to limit the starting current of the pony motor 200*a*, a device for reduced voltage starting (Y-A starting or primary resistance starting or reactor starting or autotransformer starting or soft starter starting) is provided on the pony motor starter 100*a*.

The control unit 10*a* determines whether the starting is completed based on the rotational speed of the input shaft speed sensor 320*a* installed on the input shaft 310*a* of the device, after the pony motor 200*a* is started. If the rotor of the driving induction motor 300*a* reaches the rated rotational speed, the control unit 10*a* transmits a power interruption signal to the pony motor starter 100*a* and transmits a power supply signal to the driving induction motor starter 50*a*. Subsequently, if power is supplied through the power supply cable c to the driving induction motor 300*a*, the starting of the driving induction motor 300*a* limiting the starting current is completed.

If the starting of the driving induction motor 300*a* is completed and the forward rotation is detected, the control unit 10*a* opens a valve of the same rotational direction control clutch 401*a* of the device 400*a*, and then regulates the clutch operation pressure-regulating valve to maintain the rotational speed set point, thus controlling the operation pressure of the same rotational direction control clutch 401*a*. At this time, the control unit 10*a* may check the rotational speed of the driven body 600 through the output shaft speed sensor 420*a* installed on the output shaft 410*a* of the device.

In the case where the rotational speed set point of the driven body 600 is equal to or higher than a rotational speed detected by the output shaft speed sensor 420*a* when the driving induction motor 300*a* is a rated rotational speed, or is equal to or higher than a rotational speed using the preset clutch slip, the control unit 10*a* completely opens the clutch operation pressure-regulating valve according to a preset operation speed to cause the engagement of the same rotational direction control clutch 401*a*, or eliminates the function of the clutch operation pressure-regulating valve at a time, thus causing all the pressure of a clutch operating lubricant to be transmitted to the same rotational direction control clutch 401*a* and thereby causing the engagement of the same rotational direction control clutch 401*a*. When the function of the clutch operation pressure-regulating valve is eliminated at a time, the rotational speed of the driven body 600 is momentarily reduced.

If a reverse rotation signal is inputted as the rotational speed set point into the control unit 10*a* to perform braking during the propulsion of the driven body 600, the valve of the same rotational direction control clutch 401*a* is closed, so that the same rotational direction control clutch 401*a* is blocked, and the operation pressure of the clutch operation pressure-regulating valve is eliminated. Furthermore, in order to control the rotational direction of the driven body 600 in the opposite direction, the valve of the opposite rotational direction control clutch 402*a* is opened and then the operation pressure is regulated by the clutch operation pressure-regulating valve, so that the reverse rotation control for braking the propulsive body is performed. Subsequently, if the propulsive body is stopped and the rotational speed set point is inputted as "0" rpm, the valve of the opposite rotational direction control clutch 402*a* is closed.

The lubricant temperature of the device 400*a* is increased by heat generated by the friction of the clutch. The control unit 10*a* may control the operation pressure of the clutch operation pressure-regulating valve so that the lubricant temperature measured by the lubricant temperature sensor 405*a* of the device is maintained below an alarm value.

FIG. 10 illustrates an embodiment in which the device 400*a* having therein the clutch and the gear, capable of adjusting the rotational direction of the output side according to the present disclosure is driven by a 4-stroke internal combustion engine 700*a*. If the starting of the 4-stroke internal combustion engine 700*a* used as the driving body is completed, the control unit 10*a* opens the valve of the same rotational direction control clutch 401*a* of the device 400*a* in the forward rotation, and then regulates the clutch operation pressure-regulating valve to maintain the rotational speed set point, thus controlling the operation pressure of the same rotational direction control clutch 401*a*. At this time, the control unit 10*a* may check the rotational speed of the driven body 600 through the output shaft speed sensor 420*a* installed on the output shaft 410*a* of the device.

In the case where the rotational speed set point of the driven body 600 is equal to or higher than a rotational speed detected by the output shaft speed sensor 420*a* when the 4-stroke internal combustion engine 700*a* is a rated rotational speed, or is equal to or higher than a rotational speed using the preset clutch slip, the control unit 10*a* completely opens the clutch operation pressure-regulating valve according to a preset operation speed to cause the engagement of the same rotational direction control clutch 401*a*, or eliminates the function of the clutch operation pressure-regulating valve at a time, thus causing all the pressure of a clutch operating lubricant to be transmitted to the same rotational direction control clutch 401a and thereby causing the engagement of the same rotational direction control clutch 401a. When the function of the clutch operation pressure-regulating valve is eliminated at a time, the rotational speed of the driven body 600 is momentarily reduced.

If a reverse rotation signal is inputted as the rotational speed set point into the control unit 10a to perform braking during the propulsion of the driven body 600, the valve of the same rotational direction control clutch 401a is closed, so that the same rotational direction control clutch 401a is blocked, and the operation pressure of the clutch operation pressure-regulating valve is eliminated. Furthermore, in order to control the rotational direction of the driven body 600 in the opposite direction, the valve of the opposite rotational direction control clutch 402a is opened and then the operation pressure is regulated by the clutch operation pressure-regulating valve, so that the reverse rotation control for braking the propulsive body is performed. Subsequently, if the propulsive body is stopped and the rotational speed set point is inputted as "0" rpm, the valve of the opposite rotational direction control clutch 402a is closed.

The lubricant temperature of the device 400a is increased by heat generated by the friction of the clutch. The control unit 10a may control the operation pressure of the clutch operation pressure-regulating valve so that the lubricant temperature measured by the lubricant temperature sensor 405a of the device is maintained below an alarm value.

FIG. 11 illustrates an embodiment in which a device 400a having therein a clutch and a gear, incapable of adjusting a rotational direction of an output side according to the present disclosure is driven by a driving induction motor 300a.

As the method for limiting starting current which is generated during the starting of the driving induction motor 300a used as the driving body, the small-sized induction motor is used as the pony motor 200a. To be more specific, after the pony-motor output shaft 210a is connected to the shaft of the driving induction motor 300a, the pony motor 200a is subjected to reduced voltage starting through the power supply cable f by the soft starter installed on the pony motor starter 100a, so that the rotor of the driving induction motor 300a is rotated up to the rated rotational speed of the pony motor 200a. At this time, it is unnecessary to limit the starting current of the pony motor 200a. When a coasting operation time at a stop is short, the device for full voltage starting is provided on the pony motor starter 100a.

The control unit 10a determines whether the starting is completed based on the rotational speed of the input shaft speed sensor 320a installed on the input shaft 310a of the device, after the pony motor 200a is started. At this time, if the rotor of the driving induction motor 300a reaches the rated rotational speed, the control unit 10a transmits a power interruption signal to the pony motor starter 100a and transmits a power supply signal to the driving induction motor starter 50a. Subsequently, if power is supplied through the power supply cable c to the driving induction motor 300a, the starting of the driving induction motor 300a limiting the starting current is completed.

If the starting of the driving induction motor 300a is completed and the forward rotation is detected, the control unit 10a opens a valve of the same rotational direction control clutch 401a of the device 400a, and then regulates the clutch operation pressure-regulating valve to maintain the rotational speed set point, thus controlling the operation pressure of the same rotational direction control clutch 401a. At this time, the control unit 10a may check the rotational speed of the driven body 600 through the output shaft speed sensor 420a installed on the output shaft 410a of the device.

In the case where the rotational speed set point of the driven body 600 is equal to or higher than a rotational speed detected by the output shaft speed sensor 420a when the driving induction motor 300a is a rated rotational speed, or is equal to or higher than a rotational speed using the preset clutch slip, the control unit 10a completely opens the clutch operation pressure-regulating valve according to a preset operation speed to cause the engagement of the same rotational direction control clutch 401a, or eliminates the function of the clutch operation pressure-regulating valve at a time, thus causing all the pressure of a clutch operating lubricant to be transmitted to the same rotational direction control clutch 401a and thereby causing the engagement of the same rotational direction control clutch 401a. When the function of the clutch operation pressure-regulating valve is eliminated at a time, the rotational speed of the driven body 600 is momentarily reduced.

If a reverse rotation signal is inputted as the rotational speed set point into the control unit 10a to perform braking during the propulsion of the driven body 600, the valve of the same rotational direction control clutch 401a is closed, so that the same rotational direction control clutch 401a is blocked, and the operation pressure of the clutch operation pressure-regulating valve is eliminated. Furthermore, after the power of the driving induction motor starter 50a is shut off, the soft starter installed on the pony motor starter 100a is operated and the brake function of the soft starter is used, thus stopping the pony motor 200a.

Subsequently, if the stoppage of the pony motor 200a is checked by the rotational speed of the input shaft speed sensor 320a installed on the input shaft 310a of the device, the phase rotational direction of power supplied to the soft starter to perform the reverse rotation of the pony motor 200a is converted in the reverse direction, and then the pony motor 200a is subjected to reduced voltage starting through the power supply cable f by the soft starter installed in the pony motor starter 100a, so that the rotor of the driving induction motor 300a is rotated in the reverse direction up to the rated rotational speed of the pony motor 200a.

The control unit 10a determines whether the starting is completed based on the rotational speed of the input shaft speed sensor 320a installed on the input shaft 310a of the device, after the reverse-rotation starting of the pony motor 200a is completed. If the rotor of the driving induction motor 300a reaches the rated rotational speed, the control unit 10a transmits a power interruption signal to the pony motor starter 100a and transmits a power supply signal in which the phase rotational direction of power is converted in the reverse direction to the driving induction motor starter 50a. Subsequently, if power is supplied through the power supply cable c to the driving induction motor 300a, the reverse-rotation starting of the driving induction motor 300a limiting the starting current is completed.

If the reverse rotation of the driving induction motor 300a is determined by the rotational speed of the input shaft speed sensor 320a installed on the input shaft 310a of the device, the valve of the same rotational direction control clutch 401a is opened and then the operation pressure is regulated by the clutch operation pressure-regulating valve, so that the reverse rotation control for braking the propulsive body is performed, in order to control the rotational direction of the driven body 600 in the opposite direction. Subsequently, if the propulsive body is stopped and the rotational speed set point is inputted as "0" rpm, the valve of the opposite rotational direction control clutch 401a is closed.

The lubricant temperature of the device 400*a* having the clutch and the gear embedded therein is increased by heat generated by the friction of the clutch. The control unit 10*a* may control the operation pressure of the clutch operation pressure-regulating valve so that the lubricant temperature measured by the lubricant temperature sensor 405*a* of the device is maintained below an alarm value.

FIG. 12 illustrates an embodiment in which the device 400*a* having therein the clutch and the gear, incapable of adjusting the rotational direction of the output side according to the present disclosure is driven by the 2-stroke internal combustion engine 800*a*.

If the starting of the 2-stroke internal combustion engine 800*a* used as the driving body is completed, the control unit 10*a* opens the valve of the same rotational direction control clutch 401*a* of the device 400*a* in the forward rotation, and then regulates the clutch operation pressure-regulating valve to maintain the rotational speed set point, thus controlling the operation pressure of the same rotational direction control clutch 401*a*. At this time, the control unit 10*a* may check the rotational speed of the driven body 600 through the output shaft speed sensor 420*a* installed on the output shaft 410*a* of the device.

In the case where the rotational speed set point of the driven body 600 is equal to or higher than a rotational speed detected by the output shaft speed sensor 420*a* when the 2-stroke internal combustion engine 800*a* is a rated rotational speed, or is equal to or higher than a rotational speed using the preset clutch slip, the control unit 10*a* completely opens the clutch operation pressure-regulating valve according to a preset operation speed to cause the engagement of the same rotational direction control clutch 401*a*, or eliminates the function of the clutch operation pressure-regulating valve at a time, thus causing all the pressure of a clutch operating lubricant to be transmitted to the same rotational direction control clutch 401*a* and thereby causing the engagement of the same rotational direction control clutch 401*a*. When the function of the clutch operation pressure-regulating valve is eliminated at a time, the rotational speed of the driven body 600 is momentarily reduced.

If a reverse rotation signal is inputted as the rotational speed set point into the control unit 10*a* to perform braking during the propulsion of the driven body 600, the valve of the same rotational direction control clutch 401*a* is closed, so that the same rotational direction control clutch 401*a* is blocked, and the operation pressure of the clutch operation pressure-regulating valve is eliminated. If the stoppage of the 2-stroke internal combustion engine 800*a* is checked by the rotational speed of the input shaft speed sensor 320*a* installed on the input shaft 310*a* of the device after the 2-stroke internal combustion engine 800*a* is stopped, the 2-stroke internal combustion engine 800*a* is started in the reverse rotation to be rotated up to the rated rotational speed. If the reverse rotation of the 2-stroke internal combustion engine 800*a* is determined by the rotational speed of the input shaft speed sensor 320*a* installed on the input shaft 310*a* of the device, the valve of the same rotational direction control clutch 401*a* is opened and then the operation pressure is regulated by the clutch operation pressure-regulating valve, so that the reverse rotation control for braking the propulsive body is performed, in order to control the rotational direction of the driven body 600 in the opposite direction. Subsequently, if the propulsive body is stopped and the rotational speed set point is inputted as "0" rpm, the valve of the opposite rotational direction control clutch 401*a* is closed.

The lubricant temperature of the device 400*a* is increased by heat generated by the friction of the clutch. The control unit 10*a* may control the operation pressure of the clutch operation pressure-regulating valve so that the lubricant temperature measured by the lubricant temperature sensor 405*a* is maintained below an alarm value.

FIG. 13 illustrates an embodiment in which the device 400*a* or 400*b* having therein the clutch and the gear, capable of adjusting the rotational direction of the output side according to the present disclosure is driven by the driving induction motor 300*a* or 300*b*, and is operated in parallel by the dual input-single output gear unit 500. FIG. 14 illustrates an embodiment in which the device 400*a* or 400*b* having therein the clutch and the gear, capable of adjusting the rotational direction of the output side according to the present disclosure is driven by the 4-stroke internal combustion engine 700*a* or 700*b*, and is operated in parallel by the dual input-single output gear unit 500. FIG. 15 illustrates an embodiment in which the device 400*a* or 400*b* having therein the clutch and the gear, incapable of adjusting the rotational direction of the output side according to the present disclosure is driven by the driving induction motor 300*a* or 300*b*, and is operated in parallel by the dual input-single output gear unit 500. FIG. 16 illustrates an embodiment in which the device 400*a* or 400*b* having therein the clutch and the gear, incapable of adjusting the rotational direction of the output side according to the present disclosure is driven by the 2-stroke internal combustion engine 800*a* or 800*b*, and is operated in parallel by the dual input-single output gear unit 500.

In the case of using the dual input-single output gear unit 500, a sequential load operation and a parallel operation may be performed without a synchronization process, such that the driven body 600 may be operated by one driving body if the rotational speed set point of the driven body 600 is low, and the driven body 600 may be operated by two driving bodies if the rotational speed set point is high.

Hereinafter, there will be described a method in which the devices 400*a* and 400*b* having therein the clutch and the gear, capable of adjusting the rotational direction on the output side, shown in FIGS. 13 and 14, are connected to the driving bodies 300*a* and 300*b* or 700*a* and 700*b* and are operated in the sequential load operation and the parallel operation by the dual input-single output gear unit 500.

The load operation sequence of the driving body will be described on the assumption that the driving induction motor 300*a* and the 4-stroke internal combustion engine 700*a* on the left side are first operated and the driving induction motor 300*b* and the 4-stroke internal combustion engine 700*b* on the right side are subsequently operated.

If the starting of the driving induction motors 300*a* and 700*a* is completed and the forward rotation is detected, the control unit 10*a* opens the valve of the same rotational direction control clutch 401*a* of the device 400*a*, and then regulates the clutch operation pressure-regulating valve to maintain the rotational speed set point, thus controlling the operation pressure of the same rotational direction control clutch 401*a*. At this time, the control unit 10*a* may check the rotational speed of the driven body 600 through the output shaft speed sensor 520*a* installed on the output shaft 510 of the dual input-single output gear unit.

In the case where the rotational speed set point of the driven body 600 is equal to or higher than the output for the rotational speed of the left driving bodies 300*a* and 700*a* or is equal to or higher than the output for the rotational speed of the left driving bodies 300*a* and 700*a* using the preset clutch slip, the control unit 10*b* starts the right driving bodies 300*b* and 700*b*, opens the valve of the same rotational direction control clutch 401*a* of the device 400*b*, and then regulates the clutch operation pressure-regulating valve to maintain the rotational speed set point, thus controlling the operation pressure of the same rotational direction control clutch 401*a*. At this time, the control unit 10*b* may check the rotational speed of the driven body 600 through the output shaft speed sensor 520*a* installed on the output shaft 510 of the dual input-single output gear unit.

The control units 10*a* and 10*b* control the operation pressure of the same rotational direction control clutch 401*a* of the devices 400*a* and 400*b* to perform a parallel operation. In the case where the rotational speed set point of the driven body 600 is equal to or higher than a rated output which may be produced by two driving bodies 300*a* and 300*b* or 700*a* and 700*b* at the rated rotational speed, or is equal to or higher than an output for the rotational speed of two driving bodies 300*a* and 300*b* or 700*a* and 700*b* using the preset clutch slip, the control units 10*a* and 10*b* completely open the clutch operation pressure-regulating valve according to a preset operation speed to cause the engagement of the same rotational direction control clutch 401*a*, or eliminates the function of the clutch operation pressure-regulating valve at a time, thus causing all the pressure of a clutch operating lubricant, generated at the devices 400*a* and 400*b*, to be transmitted to the same rotational direction control clutch 401*a* and thereby causing the engagement of the same rotational direction control clutch 401*a*. When the function of the clutch operation pressure-regulating valve is eliminated at a time, the rotational speed of the driven body 600 may be momentarily reduced.

If the rotational speed set points of the driving bodies 300*a* and 300*b* or 700*a* and 700*b* are equal to each other in a state where the clutch of the device 400*a* or 400*b* having therein two clutches and gear is engaged, symmetric load sharing is realized between the driving bodies, and otherwise asymmetric load sharing is realized.

If the reverse rotation signal is inputted as the rotational speed set point into the control units 10*a* and 10*b* to perform braking during the propulsion of the driven body 600, the valve of the same rotational direction control clutch 401*a* is closed, so that the same rotational direction control clutch 401*a* is blocked, and the operation pressure of the clutch operation pressure-regulating valve is eliminated.

Furthermore, in order to control the rotational direction of the driven body 600 in the opposite direction, the valve of the opposite rotational direction control clutch 402*a* is opened and then the operation pressure is regulated by the clutch operation pressure-regulating valve, so that the reverse rotation control for braking the propulsive body is performed. Subsequently, if the propulsive body is stopped and the rotational speed set point is inputted as "0" rpm, the valve of the opposite rotational direction control clutch 402*a* is closed.

The lubricant temperature of the devices 400*a* and 400*b* is increased by heat generated by the friction of the clutch. The control units 10*a* and 10*b* may control the operation pressure of the clutch operation pressure-regulating valve so that the lubricant temperature measured by the lubricant temperature sensors 405*a* and 405*b* of the devices is maintained below an alarm value.

A method in which the devices 400*a* and 400*b* having therein the clutch and the gear, incapable of adjusting the rotational direction on the output side, shown in FIGS. 15 and 16 are connected to the driving bodies 300*a* and 300*b* or 800*a* and 800*b* and are operated in the sequential load operation and the parallel operation by the dual input-single output gear unit 500 may be performed as in the method described in FIGS. 13 and 14. However, since the devices 400*a* and 400*b* having therein the clutch and the gear, incapable of adjusting the rotational direction on the output side, are used, the driving bodies 300*a* and 300*b* or 800*a* and 800*b* are rotated in the reverse direction and then braking control is performed as described in FIGS. 11 and 12 if the reverse rotation signal as the rotational speed set point is inputted into the control units 10*a* and 10*b* so as to perform braking during the propulsion of the driven body 600.

As described in FIGS. 13 to 16, the propulsion and braking system using the clutch according to the present disclosure does not require synchronization for the sequential load operation and the parallel operation unlike an existing propulsion system, so that the output shaft speed sensors 420*a* and 420*b* installed on the device output shafts 410*a* and 410*b* are not used for synchronization, and a dual (multiple) input-single output gear unit with an increased number of inputs is used in the case where the driven body 600 requiring a large output is driven by several driving bodies. At this time, the operation state of the dual (multiple) input-single output gear unit 500 may be checked by the lubricant temperature sensors 505*a* and 505*b* and the lubricant pressure sensors 506*a* and 506*b* connected to the control units 10*a* and 10*b*. Further, a load sharing state may not be determined by the rotational speed when the driving bodies are operated in parallel. Thus, when the driving body is the driving induction motor, a load amount is determined based on information (e.g. effective power (kW) etc.) acquired by the power metering and monitoring device installed on the driving induction motor starter 50*a* or 50*b*. When the driving body is the internal combustion engine, a load amount is determined based on information (e.g. fuel injection amount, air pressure supplied to a cylinder, etc.) acquired through the internal combustion engine control device.

In order to prevent the occurrence of a load deviation between the driving bodies which are in operation, the control units 10*a* and 10*b* exchange these pieces of information via communication during the parallel operation to regulate the clutch operation pressure-regulating valve and thereby perform symmetric load sharing. If asymmetric load sharing is set to the control units 10*a* and 10*b*, the clutch operation pressure-regulating valve may be regulated by reflecting the asymmetric load sharing. Furthermore, even when driving bodies connected to the dual input-single output gear unit 500 are different from each other (parallel operation between the driving induction motor and the internal combustion engine), the above-mentioned parallel operation is also possible.

Since a conventional propulsion system for a two-FPP and one-screw vessel using the dual input-single output reducer may be operated only in the state where the driving bodies are operated in parallel, the overall energy efficiency may be decreased during the low-speed and low-load operation of the driving bodies. Further, only when all the driving bodies are in a normal operation state, the propulsion of the vessel is possible. The propulsion and braking system using the clutch according to the present disclosure enables the sequential load operation of the driving bodies, so that an increase in the overall energy efficiency can be expected, and enables the propulsion of the vessel even when only one of the driving bodies may be operated, thus enhancing the operational reliability of the vessel.

FIG. 17 illustrates an embodiment in which the device having therein the clutch and the gear, capable of adjusting the rotational direction of the output side, according to the present disclosure is driven by the driving induction motor, and produces power whose frequency is converted by a driven induction motor. In the case of using the device having therein the clutch and the gear, capable of adjusting the rotational direction of the output side, the phase rotational direction may be reversed when the driven induction motor 70 is used as the induction generator.

When 50 Hz is supplied to a 6-pole driving induction motor 300a, the rotor is rotated at the rotational speed of less than 1,000 rpm in consideration of the slip. Furthermore, when 60 Hz is supplied to an 8-pole driving induction motor 300a, the rotor is rotated at the rotational speed of less than 900 rpm in consideration of the slip. On the other hand, when 50 Hz is supplied, the rotor is rotated at the rotational speed of less than 750 rpm in consideration of the slip. Therefore, when an 8-pole driven induction motor 70 is rotated at 900 rpm by the 6-pole driving induction motor 300a to which 50 Hz is supplied, the power of 60 Hz may be obtained. When the 8-pole driven induction motor 70 is rotated at 750 rpm by the 8-pole driving induction motor 300a to which 60 Hz is supplied, the power of 50 Hz may be obtained.

Hereinafter, a configuration will be described in which the power of the 60 Hz driven induction motor starter 60 is supplied through the power supply cable e to the driven induction motor 70, so that a pump 80 that is operating and connected to a pump input shaft 73 to which the 8-pole driven induction motor output shaft 71 of 900 rpm is connected through a coupling 72 is used as the 50 Hz frequency changer.

In order to use the pump as the frequency changer, the driven induction motor output shaft 71 and the coupling 72 of the pump 80 are separated, and the driven induction motor output shaft 71 is connected to the output shaft 410a of the device having therein the clutch and the gear, a 50 Hz power off base 3 is used instead of the 60 Hz driven induction motor starter 60.

In order to limit the starting current which is generated during the starting of the driving induction motor 300a used as the driving body, a small-sized induction motor is used as a pony motor 200a. If a full voltage is applied through a power supply cable f to the pony motor 200a with the pony motor starter 100a after the pony-motor output shaft 210a is connected to the shaft of the driving induction motor 300a, a rotor of the driving induction motor 300a may be rotated up to the rated rotational speed of the pony motor 200a. When it is also required to limit the starting current of the pony motor 200a, a device for reduced voltage starting (Y-Δ starting or primary resistance starting or reactor starting or autotransformer starting or soft starter starting) is provided on the pony motor starter 100a.

The control unit 10a determines whether the starting is completed based on the rotational speed of the input shaft speed sensor 320a installed on the input shaft 310a of the device, after the pony motor 200a is started. If the rotor of the driving induction motor 300a reaches the rated rotational speed, the control unit 10a transmits a power interruption signal to the pony motor starter 100a and transmits a power supply signal to the driving induction motor starter 50a. Subsequently, if power is supplied through the power supply cable c to the driving induction motor 300a, the starting of the driving induction motor 300a limiting the starting current is completed.

If the starting of the driving induction motor 300a is completed and the forward rotation is detected in response to the forward/reverse rotation operation signal, the control unit 10a opens a valve of the same rotational direction control clutch 401a of the device 400a, and then regulates the clutch operation pressure-regulating valve to maintain the rotational speed set point, thus controlling the operation pressure of the same rotational direction control clutch 401a. At this time, the control unit 10a may check the rotational speed of the driven induction motor 70 through the output shaft speed sensor 420a installed on the output shaft 410a of the device.

If the rotational speed of the driven induction motor 70 reaches the rotational speed set point, the control unit 10a connects a breaker of the 50 Hz power off base 3 to connect the driven induction motor 70 to a 50 Hz power supply, and then increases the operation pressure of the same rotational direction control clutch 401a by regulating the clutch operation pressure-regulating valve. Here, if the speed of the rotor is faster than a synchronization speed, the driven induction motor 70 is operated as the induction generator.

The output amount of the induction generator is controlled by regulating the rotational speed set point. When the rotational speed set point is 3% higher than the synchronization speed, the rated output is generated. When there is a power control system, the output amount of the device having the clutch and the gear embedded therein may be controlled through the rotational speed set point signal of the control unit 10a.

In the case where the phase rotational direction of the induction generator should be reversed, if a reverse rotation signal is given to the control unit 10a after the starting of the driving induction motor 300a is completed, the valve of the opposite rotational direction control clutch 402a of the device 400a is opened, and then the clutch operation pressure-regulating valve is regulated to maintain the rotational speed set point, thus controlling the operation pressure of the opposite rotational direction control clutch 402a. At this time, the control unit 10a may check the rotational speed of the driven induction motor 70 through the output shaft speed sensor 420a installed on the device output shaft 410a.

If the rotational speed of the driven induction motor 70 reaches the rotational speed set point, the control unit 10a connects the breaker of the 50 Hz power off base 3 to connect the driven induction motor 70 to the 50 Hz power supply, and then increases the operation pressure of the opposite rotational direction control clutch 402a by regulating the clutch operation pressure-regulating valve. At this time, if the speed of the rotor is faster than the synchronization speed, the driven induction motor 70 is operated as the induction generator in which the phase rotational direction is reversed.

Since the propulsion and braking system using the clutch according to the present disclosure may be used in place of a clutch embedded reducer which is often used in an existing system, a separate installation space is not required, and an efficient and reliable operation is possible.

Furthermore, the control units 10a and 10b are configured to be operated in conjunction with the wireless terminal 20, the driving body, and the driven body, so that the operation of the propulsion and braking system using the clutch can be remotely monitored and controlled through a mobile device or web.

Preferably, the control units 10a and 10b can monitor and control the operation through a HMI (Human Man Interface), and this configuration allows an authorized operator to monitor and control information transmitted to the wireless communication antenna IIa through the wireless terminal 20.

In order to overcome the limitations of equipment operation according to a conventional physical separation distance, the present disclosure establishes a propulsion and braking system using a clutch capable of remote monitoring and control, and transmits the operating state of the propulsion and braking system using the clutch to an operator's wireless terminal through mobile communication available in a region where the system is operating, and allows an authorized operator to perform a remote control, thus maximizing the operability of equipment.

It is apparent to those skilled in the art that the above description is merely illustrative of the technical idea of the present disclosure, and various modifications, changes and substitutions may be made without departing from the essential characteristics of the present disclosure. Accordingly, embodiments and the accompanying drawings are for explanation rather than limiting the technical spirit of the present disclosure, and the scope of the technical spirit of the present disclosure is not limited by the embodiments and the accompanying drawings. The scope of protection of the present disclosure should be construed by the appended claims, and all technical ideas within the scope equivalent thereto should be construed as being included in the scope of the present disclosure.

What is claimed is:

1. A propulsion and braking system using a clutch, the system comprising:
    a device including a clutch operation pressure-regulating valve, and the clutch and gears which are configured to control a driven body and a driving body to rotate in a same direction and in opposite directions; and
    a control unit configured to regulate a rotational speed of the driven body to enable a continuous operation at a speed that is lower than a rated rotational speed using a slip of the clutch, and perform control so that engagement timing control of the clutch and engagement of the clutch are sustained if the driven body requires operation at the rated rotational speed or higher,
    wherein, when a braking signal is inputted into the control unit during propulsion of the driven body, the control unit removes an operation pressure of the clutch that is embedded in the device and is in operation, activates the clutch for reversing a rotational direction of the driven body, and regulates the operation pressure of the clutch by the valve to enable braking of a propulsive body, and
    wherein the control unit regulates time required for propulsion and braking by regulating an operating time of the valve with a change gradient of a rotational speed set point.

2. A propulsion and braking system using a clutch, the system comprising:
    a device including a clutch operation pressure-regulating valve, and the clutch and gears which are configured to control a driven body and a driving body to rotate in a same direction or in opposite directions; and
    a control unit configured to regulate a rotational speed of the driven body to enable a continuous operation at a speed that is lower than a rated rotational speed using a slip of the clutch, and perform control so that engagement timing control of the clutch and engagement of the clutch are sustained if the driven body requires operation at the rated rotational speed or higher,
    wherein, when a braking signal is inputted into the control unit during propulsion of the driven body, the control unit removes an operation pressure of the clutch that is embedded in the device, reverses a rotational direction of the driving body, and regulates the operation pressure of the clutch through the clutch operation pressure-regulating valve to enable braking of a propulsive body, and
    wherein the control unit regulates time required for propulsion and braking by regulating an operating time of the valve with a change gradient of a rotational speed set point.

3. The propulsion and braking system of claim 1 or claim 2, wherein the gears of the device have a gear ratio corresponding to a difference in rotational speed between the driving body and the driven body.

4. The propulsion and braking system of claim 1 or claim 2, wherein the gears of the device comprise a gear unit having a gear ratio corresponding to a difference in rotational speed between the driving body and the driven body.

5. The propulsion and braking system of claim 1 or claim 2, wherein the gears comprise a multi-input gear unit configured to perform a parallel operation between a plurality of driving bodies without performing a synchronization process.

6. The propulsion and braking system of claim 1 or claim 2, wherein
    when a rotational speed of the driving body is increased in a state where the clutch of the device is engaged, the rotational speed of the driven body is increased and a load of the driven body is increased, and
    the control unit compares an overload operable range with a current output amount of the driving body, the device, and the driven body, warns an operator when a compared result exceeds a preset value, and controls the driving body, the device, and the driven body to operate within the overload operable range.

7. The propulsion and braking system of claim 1 or claim 2, wherein
    in a state where the clutch of the device is engaged or the clutch of the device is regulated by the valve to transmit power, the control unit compares an output amount for a rotational speed of the driving body with a load amount for the rotational speed of the driven body, and warns an operator that the load amount for the rotational speed of the driven body is increased when the output amount for the rotational speed of the driving body is increased compared to the load amount for the rotational speed of the driven body, and
    when the output amount for the rotational speed of the driving body is reduced compared to the load amount for the rotational speed of the driven body, the control unit warns the operator that the load amount for the rotational speed of the driven body is reduced.

8. The propulsion and braking system of claim 1 or claim 2, wherein a lubricant pressure of the device is reduced as a lubricant temperature is increased, and the control unit learns a change amount of the lubricant pressure according to the lubricant temperature and checks stability of a lubricant viscosity.

9. The propulsion and braking system of claim 1 or claim 2, wherein the control unit determines, in a state in which the clutch device is engaged, a clutch wear degree based on a magnitude of a difference in a rotational speed between an input shaft of the device and an output shaft of the device, and
    the control unit determines, in a state in which the clutch device is not engaged, the clutch wear degree based on a magnitude of a difference between a change amount of a set point transmitted to the valve to keep the rotational speed of the driven body constant and a change in the lubricant temperature.

10. The propulsion and braking system of claim 1 or claim 2, wherein the control unit detects a stick slip phenomenon occurring in a torque transmission process between the driving body and the driven body in a state where the clutch of the device is configured to not be engaged, and controls the operation pressure of the clutch.

11. The propulsion and braking system of claim 1 or claim 2, wherein the control unit keeps the rotational speed of the driven body constant when a control mode is a speed control mode, and keeps a load applied to the driving body constant when the control mode is a load control mode.

12. The propulsion and braking system of claim 1 or claim 2, wherein, when a lubricant temperature of the device increases above a permissible value due to a failure of a lubricant cooling device in a state where the clutch of the device is not engaged and an override control function of the control unit is activated, the control unit switches from a rotational speed control to a constant lubricant temperature control, and returns to the rotational speed control if the lubricant temperature is reduced within a hysteresis of an alarm value.

13. The propulsion and braking system of claim 1 or claim 2, wherein, when a sudden increase in a transient load of the driven body is detected, the control unit reduces a load of the driving body by regulating a set point of the valve to increase a slip depending on a load reduction amount of the driven body which is preset according to a sudden increase amount of a driving force, such that the rotational speed of the driving body is recovered within a rotational speed recovery time, which is permitted in a performance-class operation limit value for rotational speed transient characteristics depending on a magnitude of the sudden increase in the transient load, and gradually returns the set point of the valve to an original set point if recovery of the rotational speed is detected.

14. The propulsion and braking system of claim 1 or claim 2, wherein the control unit controls the clutch of the device and a friction brake in conjunction with each other during a brake control.

15. The propulsion and braking system of claim 1 or claim 2, wherein
- an induction motor is used as the driven body and a rotational speed of the induction motor is controlled by the control unit such that the induction motor is used as an induction generator, and
- a phase rotational direction of the induction generator is changeable if the device is configured to change the rotational direction of the driven body.

* * * * *